(12) United States Patent
Sato et al.

(10) Patent No.: US 12,242,072 B2
(45) Date of Patent: Mar. 4, 2025

(54) OPTICAL ELEMENT, IMAGE DISPLAY UNIT, AND HEAD-MOUNTED DISPLAY

(71) Applicant: FUJIFILM Corporation, Tokyo (JP)

(72) Inventors: Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/674,577

(22) Filed: May 24, 2024

(65) Prior Publication Data

US 2024/0319505 A1 Sep. 26, 2024

Related U.S. Application Data

(63) Continuation of application No. 17/957,334, filed on Sep. 30, 2022, now Pat. No. 12,032,167, which is a
(Continued)

(30) Foreign Application Priority Data

Apr. 1, 2020 (JP) ................................. 2020-065969

(51) Int. Cl.
*G02B 27/01* (2006.01)
*G02F 1/1335* (2006.01)
*G02F 1/13363* (2006.01)

(52) U.S. Cl.
CPC ... *G02B 27/0172* (2013.01); *G02F 1/133504* (2013.01); *G02F 1/133543* (2021.01); *G02F 1/13355* (2021.01); *G02F 1/133638* (2021.01)

(58) Field of Classification Search
CPC .............. G02B 27/0172; G02B 27/286; G02B 2027/0118; G02B 2027/013;
(Continued)

(56) References Cited

U.S. PATENT DOCUMENTS 6,333,773 B1* 12/2001 Faris ................. G02F 1/133514
349/98
2008/0143926 A1 6/2008 Amimori et al.
(Continued)

FOREIGN PATENT DOCUMENTS

CN 105629472 A 6/2016
JP 2018-36314 A 3/2018
(Continued)

OTHER PUBLICATIONS

Japanese Office Action for corresponding Japanese Application No. 2024-007767, dated Nov. 5, 2024, with an English translation.
(Continued)

*Primary Examiner* — Donald L Raleigh
(74) *Attorney, Agent, or Firm* — Birch, Stewart, Kolasch & Birch, LLP

(57) ABSTRACT

Provide are an optical element that can improve a utilization efficiency of light while increasing an optical path length, an image display unit, and a head-mounted display. The optical element includes, in the following order: a first absorptive linearly polarizing plate; a first reflective linearly polarizing plate; a first retardation plate; a partially reflecting mirror; a second retardation plate; and a second reflective linearly polarizing plate, in which a turning direction of circularly polarized light that is reflected from the first reflective linearly polarizing plate in a case where light transmits through the first retardation plate and is incident into the first reflective linearly polarizing plate is opposite to a turning direction of circularly polarized light that is reflected from the second reflective linearly polarizing plate in a case where light transmits through the second retardation plate and is incident into the second reflective linearly polarizing plate.

8 Claims, 7 Drawing Sheets

Related U.S. Application Data continuation of application No. PCT/JP2021/012123, filed on Mar. 24, 2021.

(58) Field of Classification Search
CPC ........ G02B 27/0103; G02B 5/18; G02B 5/30; G02F 1/133504; G02F 1/133543; G02F 1/13355; G02F 1/133638

See application file for complete search history.

(56) References Cited

U.S. PATENT DOCUMENTS

| | | |
|---|---|---|
| 2011/0019258 A1 | 1/2011 | Levola |
| 2018/0180889 A1 | 6/2018 | Lee et al. |
| 2018/0239146 A1 | 8/2018 | Bierhuizen et al. |
| 2018/0239177 A1 | 8/2018 | Oh |
| 2018/0284464 A1 | 10/2018 | Lu et al. |
| 2019/0171005 A1 | 6/2019 | Lee et al. |
| 2019/0196194 A1 | 6/2019 | Montgomery et al. |
| 2020/0041785 A1 | 2/2020 | Takagi et al. |
| 2020/0166738 A1 | 5/2020 | Khan et al. |
| 2020/0271839 A1 | 8/2020 | Saitoh et al. |
| 2021/0011319 A1 | 1/2021 | Sato et al. |
| 2021/0041610 A1 | 2/2021 | Saitoh et al. |
| 2021/0063760 A1* | 3/2021 | Ishioka .............. G02B 27/0018 |

FOREIGN PATENT DOCUMENTS

| | | |
|---|---|---|
| JP | 2018-106160 A | 7/2018 |
| JP | 2019-101424 A | 6/2019 |
| JP | 2019-117237 A | 7/2019 |
| JP | 2019-526075 A | 9/2019 |
| JP | 2020-24245 A | 2/2020 |
| KR | 10-1941459 B1 | 1/2019 |
| WO | WO 2019/017274 A1 | 1/2019 |
| WO | WO 2019/093228 A1 | 5/2019 |
| WO | WO 2019/189675 A1 | 10/2019 |
| WO | WO 2019/189818 A1 | 10/2019 |

OTHER PUBLICATIONS

English Machine Translation of Tang, W. CN 105629472 (Year: 2023).

International Preliminary Report on Patentability and English translation of the Written Opinion of the International Searching Authority (Forms PCT/IB/326, PCT/IB/373 and PCT/ISA/237) for International Application No. PCT/JP2021/012123, dated Oct. 13, 2022.

International Search Report (Form PCT/ISA/210) for International Application No. PCT/JP2021/012123, dated Jun. 1, 2021, with English translation.

Japanese Office Action for corresponding Japanese Application No. 2022-512004, dated Aug. 1, 2023, with English translation.

Non-Final Office Action issued in U.S. Appl. No. 17/957,334, mailed on Sep. 15, 2023.

Notice of Allowance issued in U.S. Appl. No. 17/957,334, mailed on Feb. 27, 2024.

* cited by examiner

OPTICAL ELEMENT, IMAGE DISPLAY UNIT, AND HEAD-MOUNTED DISPLAY

CROSS-REFERENCE TO RELATED APPLICATIONS

This application is a Continuation of U.S. application Ser. No. 17/957,334 filed on Sep. 30, 2022, which is a Continuation of PCT International Application No. PCT/JP2021/012123 filed on Mar. 24, 2021, which claims priority under 35 U.S.C. § 119(a) to Japanese Patent Application No. 2020-065969 filed on Apr. 1, 2020. Each of the above applications is hereby expressly incorporated by reference, in its entirety, into the present application.

BACKGROUND OF THE INVENTION

1. Field of the Invention

The present invention relates to an optical element that is used in a head-mounted display for virtual reality (VR), an image display unit, and a head-mounted display.

2. Description of the Related Art

In order for a user to experience so-called immersive virtual reality (VR) that does not allow transmission of external light in the real world, an optical device that is worn by the user and guides an image to the eyes of the user is used. This optical device adopts a structure where light emitted from an image display apparatus is reflected once from a reflective polarizer or the like and is reflected again using a mirror or the like to guide the light to the eyes of the user. As a result, an optical path length from the image display apparatus to the eyes of the user can be obtained, and the total thickness of the optical device can be reduced.

For example, JP2019-526075A describes a head-mounted display that includes a linear polarizer, a ¼ wave plate, a half mirror, a ¼ wave plate, and a reflective polarizer in this order from an image display apparatus side and can be used as an optical device for VR. In this optical element, light is reciprocated between the half mirror and the reflective polarizer to increase the optical path length.

SUMMARY OF THE INVENTION

As described above, in the optical device where light is reciprocated between the half mirror and the reflective polarizer to increase the optical path length, about 50% of incident light transmits through the half mirror and further about 50% of light reflected from a reflective grating is reflected from the half mirror. Therefore, there is a problem in that the utilization efficiency of light decreases to about 25% with respect to the amount of light of an image emitted from the image display apparatus.

An object of the present invention is to provide an optical element that can improve a utilization efficiency of light while increasing an optical path length, an image display unit, and a head-mounted display.

In order to achieve the object, the present invention has the following configurations.

[1] An optical element comprising, in the following order:
a first absorptive linearly polarizing plate;
a first reflective linearly polarizing plate;
a first retardation plate;
a partially reflecting mirror that allows transmission of a part of incident light and reflects a part of the incident light;
a second retardation plate; and
a second reflective linearly polarizing plate,
in which a turning direction of circularly polarized light that is reflected in a case where light transmits through the first retardation plate and is incident into the first reflective linearly polarizing plate is opposite to a turning direction of circularly polarized light that is reflected in a case where light transmits through the second retardation plate and is incident into the second reflective linearly polarizing plate.

[2] The optical element according to [1], further comprising:
a second absorptive linearly polarizing plate that is disposed on a side of the second reflective linearly polarizing plate opposite to the second retardation plate.

[3] An optical element comprising, in the following order:
a first absorptive linearly polarizing plate;
a first retardation plate;
a first reflective circularly polarizing plate;
a partially reflecting mirror that allows transmission of a part of incident light and reflects a part of the incident light;
a second reflective circularly polarizing plate; and
a second retardation plate;
in which a turning direction of circularly polarized light that is reflected from the first reflective circularly polarizing plate is opposite to a turning direction of circularly polarized light that is reflected from the second reflective circularly polarizing plate.

[4] The optical element according to [3],
wherein the second absorptive linearly polarizing plate is disposed on a side of the second retardation plate opposite to the second reflective circularly polarizing plate.

[5] The optical element according to [3] or [4],
in which at least one of the first reflective circularly polarizing plate or the second reflective circularly polarizing plate includes a cholesteric liquid crystal layer that is obtained by immobilizing a cholesteric liquid crystalline phase.

[6] The optical element according to [5],
in which at least one of the first reflective circularly polarizing plate or the second reflective circularly polarizing plate includes a plurality of the cholesteric liquid crystal layers where selective reflection center wavelengths are different.

[7] The optical element according to [5] or [6],
in which the cholesteric liquid crystal layer has a pitch gradient structure.

[8] The optical element according to any one of [3] to [7], further comprising:
a positive lens that is provided between the second reflective circularly polarizing plate and the second retardation plate.

[9] The optical element according to [1] or [2], further comprising:
a positive lens that is provided between the second reflective linearly polarizing plate and the second absorptive linearly polarizing plate.

[10] The optical element according to [8] or [9],
in which the positive lens is a diffractive lens formed of a diffraction element.

[11] The optical element according to [10],
in which the diffractive lens is a liquid crystal diffraction element that includes a liquid crystal layer including a liquid crystal compound,
the liquid crystal layer has a liquid crystal alignment pattern in which a direction of an optical axis derived from the liquid crystal compound changes while continuously rotating in at least one in-plane direction, and
in a case where a length over which the direction of the optical axis derived from the liquid crystal compound in the liquid crystal alignment pattern of the liquid crystal layer rotates by 180° in an in-plane direction is set as a single period of a diffraction structure, the liquid crystal layer has regions where periods of the diffraction structures are different in a plane.

[12] The optical element according to [11],
in which in a cross-section of the liquid crystal layer observed with a scanning electron microscope, the liquid crystal layer has regions where bright portions and dark portions derived from a liquid crystal phase are tilted with respect to a main surface of the liquid crystal layer.

[13] The optical element according to any one of [1] to [12],
in which a cross-section of the partially reflecting mirror has a curved shape.

[14] The optical element according to any one of [1] to [13],
in which the first retardation plate and the second retardation plate are λ/4 plates.

[15] An image display unit comprising:
the optical element according to any one of [1] to [14]; and
an image display apparatus that is disposed on a first absorptive linearly polarizing plate side of the optical element.

[16] A head-mounted display comprising:
the image display unit according to [15].

According to an aspect of the present invention, it is possible to provide an optical element that can improve a utilization efficiency of light while increasing an optical path length, an image display unit, and a head-mounted display.

DESCRIPTION OF THE PREFERRED EMBODIMENTS

Hereinafter, the details of the present invention will be described. The following description regarding components has been made based on a representative embodiment of the present invention. However, the present invention is not limited to the embodiment. In the present specification, numerical ranges represented by "to" include numerical values before and after "to" as lower limit values and upper limit values. In addition, "perpendicular" or "parallel" regarding an angle represents a range of the exact angle±10°, and "the same" and "different" regarding angles can be determined based on whether or not a difference between the angles is less than 5°.

In the present specification, "slow axis" represents a direction in which a refractive index in a plane is the maximum.

In the present specification, reverse wavelength dispersibility refers to a property in which an absolute value of an in-plane retardation increases as the wavelength increases, and specifically represents that Re(450) as an in-plane retardation value measured at a wavelength of 450 nm, Re(550) as an in-plane retardation value measured at a wavelength of 550 nm, and Re(650) as an in-plane retardation value measured at a wavelength of 650 nm satisfy a relationship of Re(450)≤Re(550)≤Re(650).

<Optical Element According to First Embodiment>

An optical element according to a first embodiment of the present invention includes, in the following order:
a first absorptive linearly polarizing plate;
a first reflective linearly polarizing plate;
a first retardation plate;
a partially reflecting mirror that allows transmission of a part of incident light and reflects a part of the incident light;
a second retardation plate; and
a second reflective linearly polarizing plate, in which a turning direction of circularly polarized light that is reflected in a case where light transmits through the first retardation plate and is incident into the first reflective linearly polarizing plate is opposite to a turning direction of circularly polarized light that is reflected in a case where light transmits through the second retardation plate and is incident into the second reflective linearly polarizing plate.

Figure 1:
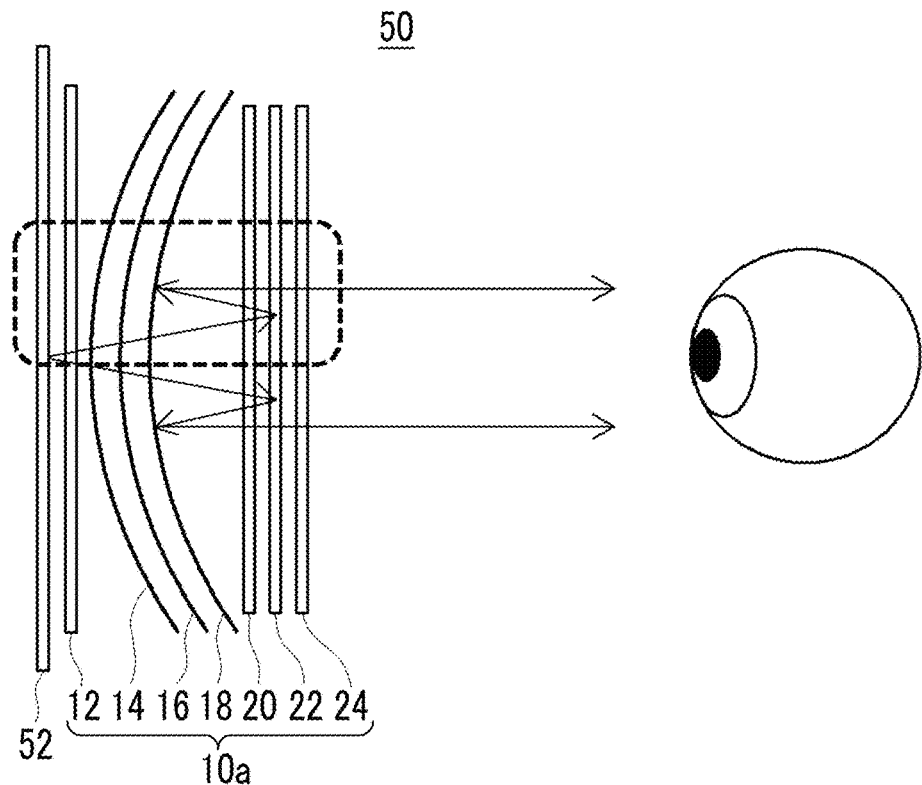
FIG. 1 is a diagram conceptually showing an example of an image display unit including an optical element according to a first embodiment of the present invention.
Figure 2:
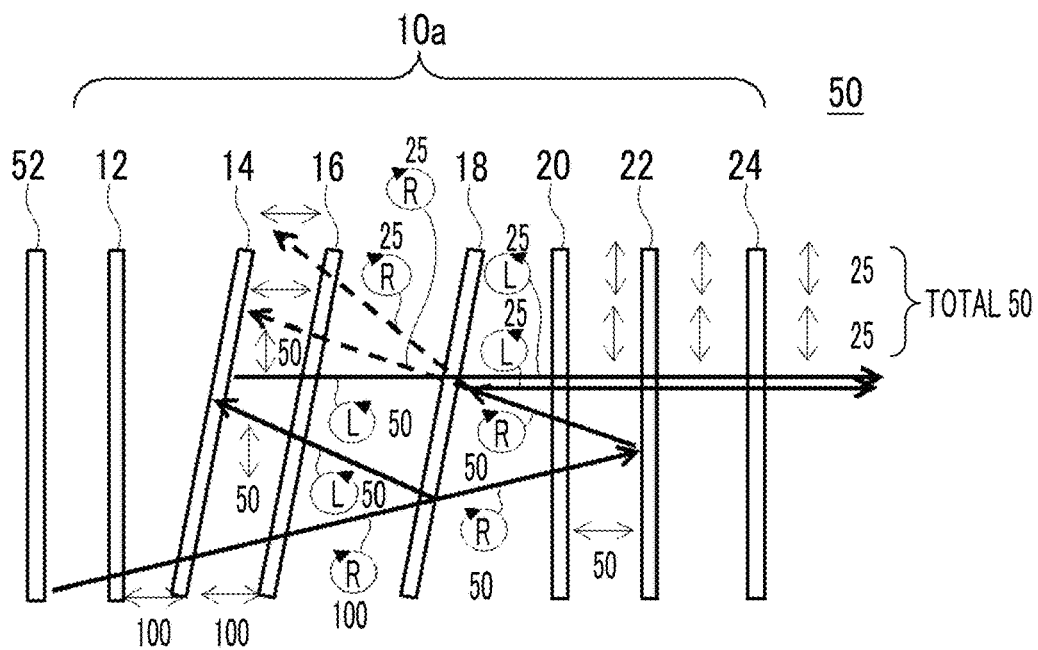
FIG. 2 is a partially enlarged view showing an action of the image display unit shown in FIG. 1.

FIG. 1 is a diagram conceptually showing an example of an image display unit including an optical element according to a first embodiment of the present invention. FIG. 2 is an enlarged view showing a part (portion surrounded by a broken line) of the image display unit shown in FIG. 1 and shows an action of the image display unit.

An image display unit 50 shown in FIGS. 1 and 2 includes: an optical element 10*a* that includes a first absorptive linearly polarizing plate 12, a first reflective linearly polarizing plate 14, a first retardation plate 16, a partially reflecting mirror 18, a second retardation plate 20, a second reflective linearly polarizing plate 22, and a second absorptive linearly polarizing plate 24 in this order; and an image display apparatus 52 that is disposed on the first absorptive linearly polarizing plate 12 side of the optical element 10*a*.

In the image display unit 50, in a case where the image display apparatus 52 emits light (image), the light passes through the first absorptive linearly polarizing plate 12, the first reflective linearly polarizing plate 14, the first retardation plate 16, the partially reflecting mirror 18, and the second retardation plate 20, is reflected from the second reflective linearly polarizing plate 22, passes through the second retardation plate 20, is reflected from the partially reflecting mirror 18, passes through the second retardation plate 20, the second reflective linearly polarizing plate 22, and the second absorptive linearly polarizing plate 24, and is emitted to a user U. In this case, the light reciprocates between the second reflective linearly polarizing plate 22 and the partially reflecting mirror 18 such that an optical path length can be obtained in a limited space, which contributes to a reduction in the size of the optical element and the image display unit.

Figure 3:
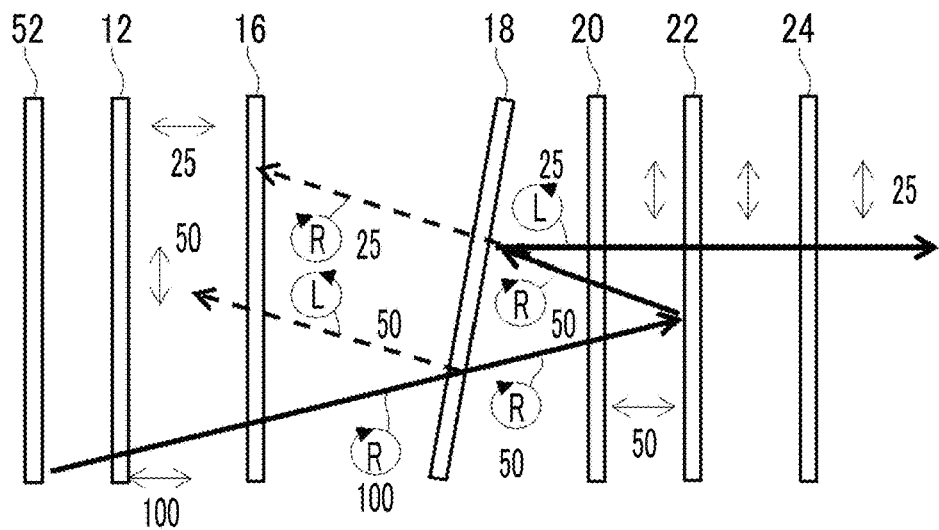
FIG. 3 is a conceptual diagram showing an action of an image display unit in the related art.

Here, an action of an image display unit in the related art will be described using FIG. 3. In FIG. 3, the vicinity of each of the members is shown to show a polarization state of light transmitted through each of the members and the amount of light thereof. In a case where the polarization state of light is linearly polarized light, the linearly polarized light is indicated by an arrow in an up-down direction or an arrow in a left-right direction. In a case where the polarization state of light is circularly polarized light, the circularly polarized light is indicated by a circular arrow. In addition, linearly polarized light indicated by the arrow in the up-down direction and linearly polarized light indicated by the arrow in the left-right direction are perpendicular to each other. In addition, right circularly polarized light is indicated by a clockwise arrow, and left circularly polarized light is indicated by a counterclockwise arrow.

In the image display unit in the related art shown in FIG. 3, In a case where the image display apparatus 52 emits light (image), the light passes through the first absorptive linearly polarizing plate 12 and is converted into linearly polarized light. In the following description, it is assumed that the amount of light passed through the first absorptive linearly polarizing plate 12 is 100%. In addition, in the following description, it is assumed that the first absorptive linearly polarizing plate 12 allows transmission of linearly polarized light indicated by the arrow in the left-right direction in the drawing.

The polarization state of the linearly polarized light transmitted through the first absorptive linearly polarizing plate 12 is converted into circularly polarized light or elliptically polarized light by the first retardation plate 16. In the description of the example of FIG. 3, it is assumed that the first retardation plate 16 is a λ/4 plate and converts linearly polarized light into circularly polarized light. In addition, in the description of the example of FIG. 3, it is assumed that the first retardation plate 16 converts linearly polarized light indicated by the arrow in the left-right direction into right circularly polarized light and converts right circularly polarized light into linearly polarized light indicated by the arrow in the left-right direction. The amount of light passed through the first retardation plate 16 is 100%.

In the light passed through the first retardation plate 16, a part of the light is reflected from the partially reflecting mirror 18, and the other part of the light transmits through the partially reflecting mirror 18. In the description of the example of FIG. 3, it is assumed that 50% of the incident light is reflected and 50% of the incident light is transmitted. Light reflected from the partially reflecting mirror 18 is converted into left circularly polarized light during the reflection. Therefore, in a case where the light transmits through the first retardation plate 16, the light is converted into linearly polarized light indicated by the arrow in the up-down direction and is incident into the first absorptive linearly polarizing plate 12. The first absorptive linearly polarizing plate 12 allows transmission of linearly polarized light indicated by the arrow in the left-right direction and absorbs linearly polarized light indicated by the arrow in the up-down direction.

On the other hand, in the right circularly polarized light transmitted through the partially reflecting mirror 18, the amount of light is 50%, and the light is incident into the second retardation plate 20. The second retardation plate 20 converts circularly polarized light into linearly polarized light. In the description of the example of FIG. 3, it is assumed that the second retardation plate 20 is a λ/4 plate, converts circularly polarized light into linearly polarized light, and converts linearly polarized light into circularly polarized light. In addition, in the description of the example of FIG. 3, it is assumed that the second retardation plate 20 converts right circularly polarized light into linearly polarized light indicated by the arrow in the left-right direction.

The linearly polarized light transmitted through the second retardation plate 20 is reflected from the second reflective linearly polarizing plate 22. That is, the second reflective linearly polarizing plate 22 reflects linearly polarized light indicated by the arrow in the left-right direction and allows transmission of linearly polarized light indicated by the arrow in the up-down direction.

The linearly polarized light reflected from the second reflective linearly polarizing plate 22 is incident into the second retardation plate 20 and is converted into right circularly polarized light.

In the right circularly polarized light transmitted through the second retardation plate 20, a part of the light is reflected from the partially reflecting mirror 18, and a part of the light transmits through the second retardation plate 20. In a case where 25% of the light transmitted through the partially reflecting mirror 18 transmits through the first retardation plate 16, the light is converted into linearly polarized light indicated by the arrow in the left-right direction and is incident into the first absorptive linearly polarizing plate 12. The first absorptive linearly polarizing plate 12 allows transmission of linearly polarized light indicated by the arrow in the left-right direction in the drawing. Therefore, this linearly polarized light transmits through the first absorptive linearly polarizing plate 12 and returns to the image display apparatus 52.

On the other hand, in the right circularly polarized light reflected from the partially reflecting mirror 18, the amount of light is 25%, and the light is converted into left circularly polarized light during the reflection and is incident into the second retardation plate 20. The second retardation plate 20 converts left circularly polarized light into linearly polarized light indicated by the arrow in the up-down direction. The second reflective linearly polarizing plate 22 allows transmission of linearly polarized light indicated by the arrow in the up-down direction. The linearly polarized light transmitted through the second retardation plate 20 is transmitted as it is. The linearly polarized light transmitted through the second reflective linearly polarizing plate 22 is incident into the second absorptive linearly polarizing plate 24. The second absorptive linearly polarizing plate 24 absorbs linearly polarized light indicated by the arrow in the left-right direction and allows transmission of linearly polarized light indicated by the arrow in the up-down direction. Therefore, the incident linearly polarized light is transmitted as it is. Accordingly, 25% of the linearly polarized light is emitted from the image display unit.

This way, in the image display unit in the related art, about 50% of the incident light transmits through the partially reflecting mirror, and about 50% of the light reflected from the reflective linearly polarizing plate is further reflected from the partially reflecting mirror. Therefore, the utilization efficiency of light decreases to about 25% with respect to the amount of light of an image emitted from the image display apparatus.

On the other hand, an action of the image display unit including the optical element according to the embodiment of the present invention will be described using FIG. 2.

In the image display unit 50 shown in FIG. 2, in a case where the image display apparatus 52 emits light (image), the light passes through the first absorptive linearly polarizing plate 12 and is converted into linearly polarized light indicated by the arrow in the left-right direction. In the following description, it is assumed that the amount of light passed through the first absorptive linearly polarizing plate 12 is 100%.

The linearly polarized light transmitted through the first absorptive linearly polarizing plate 12 is incident into the first reflective linearly polarizing plate 14. The first reflective linearly polarizing plate 14 allows transmission of linearly polarized light in the same direction as that of the first absorptive linearly polarizing plate, that is, linearly polarized light indicated by the arrow in the left-right direction.

The polarization state of the linearly polarized light transmitted through the first reflective linearly polarizing plate 14 is converted into circularly polarized light or elliptically polarized light by the first retardation plate 16. In the description of the example of FIG. 2, it is assumed that the first retardation plate 16 is a λ/4 plate and converts linearly polarized light into circularly polarized light. In addition, in the description of the example of FIG. 2, it is assumed that the first retardation plate 16 converts linearly polarized light indicated by the arrow in the left-right direction into right circularly polarized light. The amount of light passed through the first retardation plate 16 is 100%.

In the light passed through the first retardation plate 16, a part of the light is reflected from the partially reflecting mirror 18, and the other part of the light transmits through the partially reflecting mirror 18. In the description of the example of FIG. 2, it is assumed that half of the incident light is reflected and half of the incident light is transmitted. 50% of the right circularly polarized light transmitted through the partially reflecting mirror 18 is incident into the second retardation plate 20. The second retardation plate 20 converts circularly polarized light into linearly polarized light. In the description of the example of FIG. 2, it is assumed that the second retardation plate 20 is a λ/4 plate, converts circularly polarized light into linearly polarized light, and converts linearly polarized light into circularly polarized light. In addition, in the description of the example of FIG. 2, it is assumed that the second retardation plate 20 converts right circularly polarized light into linearly polarized light indicated by the arrow in the left-right direction.

The linearly polarized light transmitted through the second retardation plate 20 is reflected from the second reflective linearly polarizing plate 22. That is, the second reflective linearly polarizing plate 22 reflects linearly polarized light indicated by the arrow in the left-right direction and allows transmission of linearly polarized light indicated by the arrow in the up-down direction.

The linearly polarized light reflected from the second reflective linearly polarizing plate 22 is incident into the second retardation plate 20 and is converted into right circularly polarized light.

In the right circularly polarized light transmitted through the second retardation plate 20, a part of the light is reflected from the partially reflecting mirror 18, and a part of the light transmits through the second retardation plate 20. In a case where 25% of the right circularly polarized light transmitted through the partially reflecting mirror 18 transmits through the first retardation plate 16, the light is converted into linearly polarized light indicated by the arrow in the left-right direction and is incident into the first reflective linearly polarizing plate 14. The first reflective linearly polarizing plate 14 allows transmission of linearly polarized light indicated by the arrow in the left-right direction. Therefore, this linearly polarized light transmits through the first reflective linearly polarizing plate 14 and is incident into the first absorptive linearly polarizing plate 12. The first absorptive linearly polarizing plate 12 allows transmission of linearly polarized light indicated by the arrow in the left-right direction in the drawing. Therefore, this linearly polarized light transmits through the first absorptive linearly polarizing plate 12 and returns to the image display apparatus 52.

On the other hand, in the right circularly polarized light reflected from the partially reflecting mirror 18, the amount of light is 25%, and the light is converted into left circularly polarized light during the reflection and is incident into the second retardation plate 20. The second retardation plate 20 converts left circularly polarized light into linearly polarized light indicated by the arrow in the up-down direction. The second reflective linearly polarizing plate 22 allows transmission of linearly polarized light indicated by the arrow in the up-down direction. The linearly polarized light transmitted through the second retardation plate 20 is transmitted as it is. The linearly polarized light transmitted through the second reflective linearly polarizing plate 22 is incident into the second absorptive linearly polarizing plate 24. The second absorptive linearly polarizing plate 24 absorbs linearly polarized light indicated by the arrow in the left-right direction and allows transmission of linearly polarized light indicated by the arrow in the up-down direction. n. Therefore, the incident linearly polarized light is transmitted as it is. As a result, 25% of the light is emitted.

Here, 50% of the light that transmits through the first retardation plate 16 and then is reflected from the partially reflecting mirror 18 is converted into the left circularly polarized light during the reflection. Therefore, in a case where the light transmits through the first retardation plate 16, the light is converted into linearly polarized light indicated by the arrow in the up-down direction and is incident into the first reflective linearly polarizing plate 14. The first reflective linearly polarizing plate 14 allows transmission of linearly polarized light indicated by the arrow in the left-right direction and reflects linearly polarized light indicated by the arrow in the up-down direction. Therefore, the linearly polarized light indicated by the arrow in the up-down direction is reflected.

50% of the linearly polarized light reflected from the first reflective linearly polarizing plate 14 is incident into the first retardation plate 16 and is converted into left circularly polarized light.

In the left circularly polarized light passed through the first retardation plate 16, 25% of the light is reflected from the partially reflecting mirror 18, and 25% of the light transmits through the partially reflecting mirror 18. 25% of the left circularly polarized light transmitted through the partially reflecting mirror 18 is incident into the second retardation plate 20 and is converted into linearly polarized light indicated by the arrow in the up-down direction.

The linearly polarized light transmitted through the second retardation plate 20 is incident into the second reflective linearly polarizing plate 22. The second reflective linearly polarizing plate 22 allows transmission of linearly polarized light indicated by the arrow in the up-down direction. The linearly polarized light transmitted through the second retardation plate 20 is transmitted as it is. The linearly polarized light transmitted through the second reflective linearly polarizing plate 22 is incident into the second absorptive linearly polarizing plate 24. The second absorptive linearly polarizing plate 24 absorbs linearly polarized light indicated by the arrow in the left-right direction and allows transmission of linearly polarized light indicated by the arrow in the up-down direction. Therefore, the incident linearly polarized light is transmitted as it is. As a result, 25% of the light is further emitted.

This way, in the image display unit 50 including the optical element according to the embodiment of the present invention, about 50% of the light with respect to the amount of light of the image emitted from the image display apparatus 52 can be emitted by the sum of 25% of the component reflected and emitted from the second reflective linearly polarizing plate 22 and the partially reflecting mirror 18 and 25% of the component reflected and emitted from the partially reflecting mirror 18 and the first reflective linearly polarizing plate 14. As a result, the utilization efficiency of light can be improved.

In the examples shown in FIGS. 1 and 2, in a preferable aspect, the second absorptive linearly polarizing plate 24 that is disposed on a side of the second reflective linearly polarizing plate 22 opposite to the second retardation plate 20 is further provided. Actually, a retardation that is given to light by the second retardation plate 20 deviates from an ideal retardation depending on wavelengths or incidence angles. Therefore, the linearly polarized light converted by the second retardation plate 20 is not complete linearly polarized light. Therefore, a part of the light reflected from the second reflective linearly polarizing plate 22 is transmitted such that a ghost image may occur. On the other hand, by providing the second absorptive linearly polarizing plate 24, light that transmits through the second reflective linearly polarizing plate 22 without being reflected therefrom is absorbed, and the occurrence of a ghost image can be suppressed.

Here, as described above, circularly polarized light that is reflected in a case where light transmits through the first retardation plate 16 and is incident into the first reflective linearly polarizing plate 14 is left circularly polarized light. On the other hand, circularly polarized light that is reflected in a case where light transmits through the second retardation plate 20 and is incident into the second reflective linearly polarizing plate 22 is right circularly polarized light. That is, a turning direction of circularly polarized light that is reflected in a case where light transmits through the first retardation plate 16 and is incident into the first reflective linearly polarizing plate 14 is opposite to a turning direction of circularly polarized light that is reflected in a case where light transmits through the second retardation plate 20 and is incident into the second reflective linearly polarizing plate 22. The turning direction of the circularly polarized light that is reflected from a combination of the first retardation plate 16 and the first reflective linearly polarizing plate 14 is opposite to the turning direction of the circularly polarized light that is reflected from a combination of the second retardation plate 20 and the second reflective linearly polarizing plate 22. With this configuration, as described above, about 50% of the light with respect to the amount of light of the image emitted from the image display apparatus 52 can be emitted.

Here, in the example shown in FIG. 1, in a preferable aspect, a cross-section of the partially reflecting mirror 18 has a curved shape. That is, the partially reflecting mirror 18 is curved. By forming the partially reflecting mirror 18 in a curved shape, a traveling direction of the light emitted from the image display apparatus 52 can be adjusted. Specifically, in the example shown in FIG. 1, the partially reflecting mirror 18 is curved at a predetermined curvature to be convex on the image display apparatus 52 side. As a result, reflection directions in a case where light is reflected from partially reflecting mirror 18 can change depending on positions in a plane direction. Therefore, in the example shown in FIG. 1, light emitted in various directions from substantially the center of the image display apparatus 52 can be made to travel in a direction substantially perpendicular to a display surface of the image display apparatus 52. In the example shown in the drawing, by curving the partially reflecting mirror 18, diffused light emitted from the image display apparatus 52 is substantially parallel light. The parallelism of the light emitted from the image display apparatus 52 is adjusted depending on a position of distance at which the image is displayed as a virtual image. For example, in a case where the light emitted from the image display apparatus 52 is parallel light, the user sees the image as if the image is positioned at infinity.

In addition, in the example shown in FIG. 1, the first reflective linearly polarizing plate 14 and the first retardation plate 16 are curved in substantially the same shape as a curved shape of the partially reflecting mirror 18. As a result, a traveling direction of light reflected from the first reflective linearly polarizing plate 14 can be adjusted.

Figure 4:
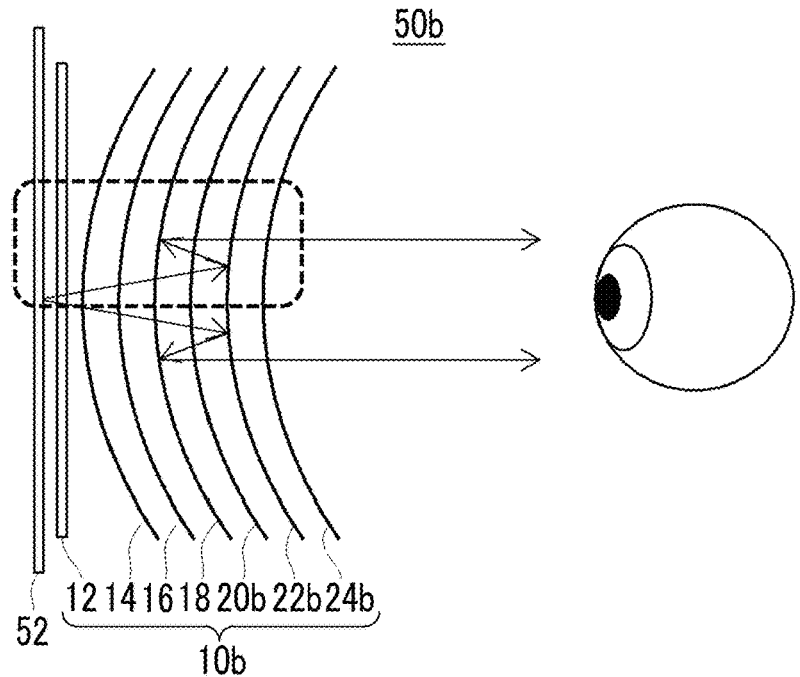
FIG. 4 is a diagram conceptually showing another example of the image display unit including the optical element according to the first embodiment of the present invention.

In the example shown in FIG. 1, the first reflective linearly polarizing plate 14, the first retardation plate 16, and the partially reflecting mirror 18 have a curved shape, and the other members have a flat shape. However, the present invention is not limited to this example. As in an optical element 10*b* of an image display system 50*b* shown in FIG. 4, not only the first reflective linearly polarizing plate 14, the first retardation plate 16, and the partially reflecting mirror 18 but also a second retardation plate 20*b*, a second reflective linearly polarizing plate 22*b*, and a second absorptive linearly polarizing plate 24*b* may have a curved shape. As a result, a traveling direction of light reflected from the second reflective linearly polarizing plate 22b can be adjusted.

The curved shape of the partially reflecting mirror 18 may be appropriately set depending on the traveling direction of the light emitted from the image display apparatus 52, a desired emission direction of the light emitted from the image display system, and the like.

In addition, in the example shown in FIG. 1, the partially reflecting mirror 18 has a curved shape, but the present invention is not limited thereto. As in the example shown in FIG. 5, a configuration in which the partially reflecting mirror 18 has a flat shape and a positive lens 29 is provided between the second reflective linearly polarizing plate 22 and the second absorptive linearly polarizing plate 24 may be adopted.

Figure 5:
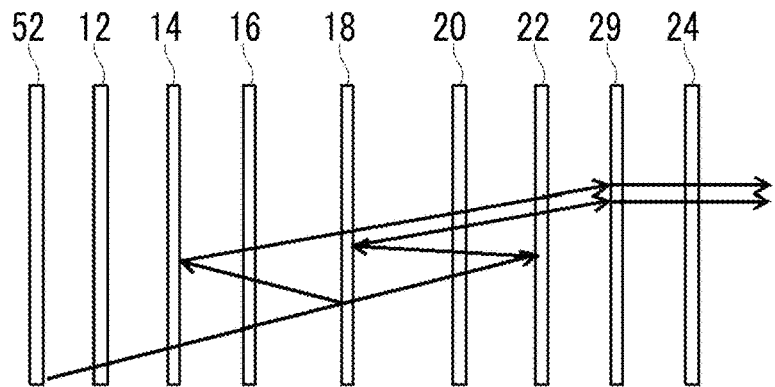
FIG. 5 is a diagram conceptually showing another example of the image display unit including the optical element according to the first embodiment of the present invention.

In a case where the partially reflecting mirror 18 and the like have a flat shape, as shown in FIG. 5, light that is emitted in an oblique direction from the image display apparatus 52 travels in the oblique direction during reflection from the partially reflecting mirror 18 and the like. By providing the positive lens 29, the light is focused, and the traveling direction of the light emitted from the image display apparatus 52 can be adjusted. In the example shown in the drawing, light emitted in an oblique direction from the image display apparatus 52 is made to travel in a direction substantially perpendicular to a display surface of the image display apparatus 52. In other words, in the example shown in the drawing, the positive lens 29 converts the diffused light emitted from the image display apparatus 52 into parallel light.

In addition, in the example shown in FIG. 5, in the image display system, the partially reflecting mirror 18 and the like have a flat shape, and the positive lens 29 is provided. However, the present invention is not limited to this configuration. The image display system may have a configuration in which the partially reflecting mirror 18 and the like have a curved shape and the positive lens 29 is provided. In this case, by combining the effects of the curved shape of the partially reflecting mirror 18 and the like and the positive lens 29, the traveling direction of the light emitted from the image display apparatus 52 can be adjusted.

In addition, the distance between the members is not particularly limited. As the distance between the partially reflecting mirror 18 and the first reflective linearly polarizing plate 14 and the distance between the partially reflecting mirror 18 and the second reflective linearly polarizing plate 22 increase, the optical path length can increase. From this viewpoint, each of the distance between the partially reflecting mirror 18 and the first reflective linearly polarizing plate 14 and the distance between the partially reflecting mirror 18 and the second reflective linearly polarizing plate 22 is preferably 0.1 mm to 100 mm and more preferably 1 mm to 50 mm.

In addition, from the viewpoint of making the optical path length of light reflected from the partially reflecting mirror 18 and the first reflective linearly polarizing plate 14 and the optical path length of light reflected from the second reflective linearly polarizing plate 22 and the partially reflecting mirror 18 the same, it is preferable that the distance between the partially reflecting mirror 18 and the first reflective linearly polarizing plate 14 and the distance between the second reflective linearly polarizing plate 22 and the partially reflecting mirror 18 are the same.

Optical Element according to Second Embodiment

An optical element according to a second embodiment of the present invention includes, in the following order:
a first absorptive linearly polarizing plate;
a first retardation plate;
a first reflective circularly polarizing plate;
a partially reflecting mirror that allows transmission of a part of incident light and reflects a part of the incident light;
a second reflective circularly polarizing plate; and
a second retardation plate,
in which a turning direction of circularly polarized light that is reflected from the first reflective circularly polarizing plate is opposite to a turning direction of circularly polarized light that is reflected from the second reflective circularly polarizing plate.

Figure 6:
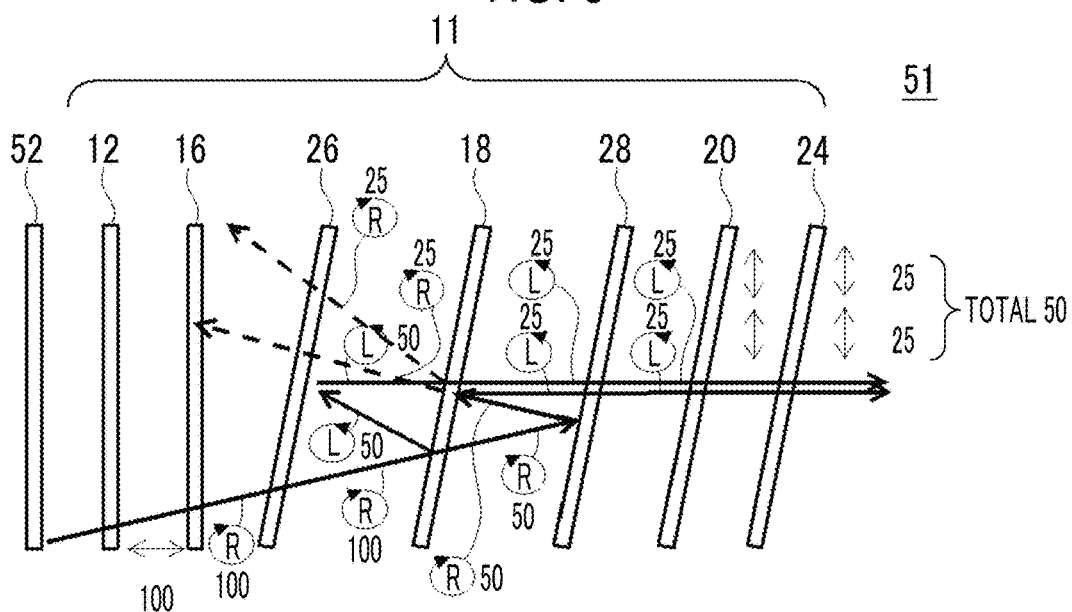
FIG. 6 is a diagram conceptually showing an example of an image display unit including an optical element according to a second embodiment of the present invention.

FIG. 6 is an enlarged view showing a part of an image display unit including the optical element according to the second embodiment of the present invention and shows an action of the image display unit.

An image display unit 51 shown in FIG. 6 includes: an optical element 11 that includes the first absorptive linearly polarizing plate 12, the first retardation plate 16, a first reflective circularly polarizing plate 26, the partially reflecting mirror 18, a second reflective circularly polarizing plate 28, the second retardation plate 20, and the second absorptive linearly polarizing plate 24 in this order; and the image display apparatus 52 that is disposed on the first absorptive linearly polarizing plate 12 side of the optical element 11.

In the image display unit 51, in a case where the image display apparatus 52 emits light (image), the light passes through the first absorptive linearly polarizing plate 12, the first retardation plate 16, the first reflective circularly polarizing plate 26, and the partially reflecting mirror 18, is reflected from the second reflective circularly polarizing plate 28, is reflected from the partially reflecting mirror 18, passes through the second reflective circularly polarizing plate 28, the second retardation plate 20, and the second absorptive linearly polarizing plate 24, and is emitted to the user U. In this case, the light reciprocates between the second reflective circularly polarizing plate 28 and the partially reflecting mirror 18 such that an optical path length can be obtained in a limited space, which contributes to a reduction in the size of the optical element and the image display unit.

The reflective circularly polarizing plate reflects circularly polarized light in one turning direction and allows transmission of circularly polarized light in another turning direction. In the present invention, a turning direction of circularly polarized light that is reflected from the first reflective circularly polarizing plate 26 is opposite to a turning direction of circularly polarized light that is reflected from the second reflective circularly polarizing plate 28. In the following description, it is assumed that the first reflective circularly polarizing plate 26 reflects left circularly polarized light and allows transmission of right circularly polarized light, and the second reflective circularly polarizing plate 28 reflects right circularly polarized light and allows transmission of left circularly polarized light.

In the image display unit 51 shown in FIG. 6, in a case where the image display apparatus 52 emits light (image), the light passes through the first absorptive linearly polarizing plate 12 and is converted into linearly polarized light indicated by the arrow in the left-right direction. In the following description, it is assumed that the amount of light passed through the first absorptive linearly polarizing plate 12 is 100%.

The linearly polarized light transmitted through the first absorptive linearly polarizing plate 12 is incident into the first retardation plate 16. The polarization state of the linearly polarized light incident into the first retardation plate 16 is converted into circularly polarized light or elliptically polarized light by the first retardation plate 16. In the description of the example of FIG. 6, it is assumed that the first retardation plate 16 is a λ/4 plate and converts linearly polarized light into circularly polarized light. In addition, in the description of the example of FIG. 6, it is assumed that the first retardation plate 16 converts linearly polarized light indicated by the arrow in the left-right direction into right circularly polarized light. The amount of light passed through the first retardation plate 16 is 100%.

The right circularly polarized light transmitted through the first retardation plate 16 is incident into the first reflective circularly polarizing plate 26. As described above, the first reflective circularly polarizing plate 26 allows transmission of right circularly polarized light. Therefore, 100% of the right circularly polarized light transmits through the first reflective circularly polarizing plate 26 and is incident into the partially reflecting mirror 18.

In the light incident into the partially reflecting mirror 18, a part of the light is reflected from the partially reflecting mirror 18, and the other part of the light transmits through the partially reflecting mirror 18. In the description of the example of FIG. 6, it is assumed that half of the incident light is reflected and half of the incident light is transmitted. 50% of the right circularly polarized light transmitted through the partially reflecting mirror 18 is incident into the second reflective circularly polarizing plate 28. As described above, the second reflective circularly polarizing plate 28 reflects right circularly polarized light. The right circularly polarized light incident into the second reflective circularly polarizing plate 28 is reflected and is incident into the partially reflecting mirror 18.

In 50% of the right circularly polarized light incident into the partially reflecting mirror, a part of the light is reflected, and a part of the light transmits through the partially reflecting mirror. 25% of the right circularly polarized light transmitted through the partially reflecting mirror 18 is incident into the first reflective circularly polarizing plate 26, and the first reflective circularly polarizing plate 26 allows transmission of right circularly polarized light. Therefore, the right circularly polarized light passes through the first reflective circularly polarizing plate 26 as it is and is incident into the first retardation plate 16. The light incident into the first retardation plate 16 is linearly polarized light indicated by the arrow in the left-right direction and is incident into the first absorptive linearly polarizing plate 12. The first absorptive linearly polarizing plate 12 allows transmission of linearly polarized light indicated by the arrow in the left-right direction in the drawing. Therefore, this linearly polarized light transmits through the first absorptive linearly polarizing plate 12 and returns to the image display apparatus 52.

On the other hand, in the right circularly polarized light reflected from the partially reflecting mirror 18, the amount of light is 25%, and the light is converted into left circularly polarized light during the reflection and is incident into the second reflective circularly polarizing plate 28. The second reflective circularly polarizing plate 28 allows transmission of left circularly polarized light. Therefore, the left circularly polarized light passes through the second reflective circularly polarizing plate 28 as it is and is incident into the second retardation plate 20. The second retardation plate 20 converts left circularly polarized light into linearly polarized light indicated by the arrow in the up-down direction. The second absorptive linearly polarizing plate 24 allows transmission of linearly polarized light indicated by the arrow in the up-down direction. The linearly polarized light transmitted through the second retardation plate 20 is transmitted as it is. As a result, 25% of the light is emitted.

Here, 50% of the light that transmits through the first reflective circularly polarizing plate 26 and then is reflected from the partially reflecting mirror 18 is converted into the left circularly polarized light during the reflection. Therefore, the light is incident into the first reflective circularly polarizing plate 26 and is reflected. In 50% of the left circularly polarized light reflected from the first reflective circularly polarizing plate 26, 25% of the light is reflected from the partially reflecting mirror 18, and 25% of the light transmits through the partially reflecting mirror 18. 25% of the left circularly polarized light transmitted through the partially reflecting mirror 18 is incident into the second reflective circularly polarizing plate 28, and the second reflective circularly polarizing plate 28 allows transmission of left circularly polarized light. Therefore, the left circularly polarized light passes through the second reflective circularly polarizing plate 28 as it is and is incident into the second retardation plate 20. The left circularly polarized light incident into the second retardation plate 20 is converted into linearly polarized light indicated by the arrow in the up-down direction.

The linearly polarized light transmitted through the second retardation plate 20 is incident into the second absorptive linearly polarizing plate 24. The second absorptive linearly polarizing plate 24 absorbs linearly polarized light indicated by the arrow in the left-right direction and allows transmission of linearly polarized light indicated by the arrow in the up-down direction. Therefore, the incident linearly polarized light is transmitted as it is. As a result, 25% of the light is further emitted.

This way, in the image display unit 51 including the optical element according to the embodiment of the present invention, about 50% of the light with respect to the amount of light of the image emitted from the image display apparatus 52 can be emitted by the sum of 25% of the component reflected and emitted from the second reflective circularly polarizing plate 28 and the partially reflecting mirror 18 and 25% of the component reflected and emitted from the partially reflecting mirror 18 and the first reflective circularly polarizing plate 26. As a result, the utilization efficiency of light can be improved.

In the examples shown in FIG. 6, in a preferable aspect, the second absorptive linearly polarizing plate 24 that is disposed on a side of the second retardation plate 20 opposite to the second reflective circularly polarizing plate 28 is provided. Actually, a retardation that is given to light by the second retardation plate 20 deviates from an ideal retardation depending on wavelengths or incidence angles. Therefore, the linearly polarized light converted by the second retardation plate 20 is not complete linearly polarized light. Therefore, a ghost image may occur. On the other hand, by providing the second absorptive linearly polarizing plate 24, the light can be converted into substantially complete linearly polarized light, and the occurrence of a ghost image can be suppressed.

Here, in the example shown in FIG. 6, in a preferable aspect, a cross-section of the partially reflecting mirror 18 has a curved shape as in the example shown in FIG. 1. That is, the partially reflecting mirror 18 is curved. By forming the partially reflecting mirror 18 in a curved shape, a traveling direction of the light emitted from the image display apparatus 52 can be adjusted. Specifically, in the example shown in FIG. 6, the partially reflecting mirror 18 is curved at a predetermined curvature to be convex on the image display apparatus 52 side. As a result, reflection directions in a case where light is reflected from partially reflecting mirror 18 can change depending on positions in a plane direction. Therefore, in the example shown in FIG. 6, light emitted in various directions from substantially the center of the image display apparatus 52 can be made to travel in a direction substantially perpendicular to a display surface of the image display apparatus 52. In the example shown in the drawing, by forming the partially reflecting mirror 18 in a curved shape, diffused light emitted from the image display apparatus 52 is parallel light.

In addition, in the example shown in FIG. 6, the first reflective circularly polarizing plate 26, the second reflective circularly polarizing plate 28, the second retardation plate 20, and the second absorptive linearly polarizing plate 24 are curved in substantially the same shape as a curved shape of the partially reflecting mirror 18. As a result, a traveling direction of light reflected from the first reflective circularly polarizing plate 26 and the second reflective circularly polarizing plate 28 can be adjusted.

In addition, in the example shown in FIG. 6, the partially reflecting mirror 18 and the like have a curved shape, but the present invention is not limited thereto. As in the example shown in FIG. 7, a configuration in which each of the members such as the partially reflecting mirror 18 has a flat shape and the positive lens 29 is provided between the second reflective circularly polarizing plate 28 and the second retardation plate 20 may be adopted.

Figure 7:
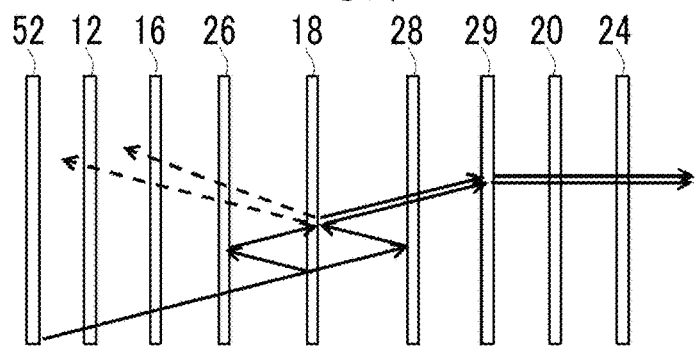
FIG. 7 is a diagram conceptually showing another example of the image display unit including the optical element according to the second embodiment of the present invention.

In a case where the partially reflecting mirror 18 and the like have a flat shape, as shown in FIG. 7, light that is emitted in an oblique direction from the image display apparatus 52 travels in the oblique direction during reflection from the partially reflecting mirror 18 and the reflective circularly polarizing plate. By providing the positive lens 29, the light is focused, and the traveling direction of the light emitted from the image display apparatus 52 can be adjusted. In the example shown in the drawing, light emitted in an oblique direction from the image display apparatus 52 is made to travel in a direction substantially perpendicular to a display surface of the image display apparatus 52. In the example shown in the drawing, the positive lens 29 converts the diffused light emitted from the image display apparatus 52 into parallel light.

In addition, in the example shown in FIG. 7, in the image display system, the partially reflecting mirror 18 and the like have a flat shape, and the positive lens 29 is provided. However, the present invention is not limited to this configuration. The image display system may have a configuration in which the partially reflecting mirror 18 and the like have a curved shape and the positive lens 29 is provided. In this case, by combining the effects of the curved shape of the partially reflecting mirror 18 and the like and the positive lens 29, the traveling direction of the light emitted from the image display apparatus 52 can be adjusted.

In addition, the distance between the members is not particularly limited. As the distance between the partially reflecting mirror 18 and the first reflective circularly polarizing plate 26 and the distance between the partially reflecting mirror 18 and the second reflective circularly polarizing plate 28 increase, the optical path length can increase. From this viewpoint, each of the distance between the partially reflecting mirror 18 and the first reflective circularly polarizing plate 26 and the distance between the partially reflecting mirror 18 and the second reflective circularly polarizing plate 28 is preferably 0.1 mm to 100 mm and more preferably 1 mm to 50 mm.

In addition, from the viewpoint of making the optical path length of light reflected from the partially reflecting mirror 18 and the first reflective circularly polarizing plate 26 and the optical path length of light reflected from the second reflective circularly polarizing plate 28 and the partially reflecting mirror 18 the same, it is preferable that the distance between the partially reflecting mirror 18 and the first reflective circularly polarizing plate 26 and the distance between the second reflective circularly polarizing plate 28 and the partially reflecting mirror 18 are the same.

Members Forming Optical Element

Hereinafter, the members in the optical elements according to the first embodiment and the second embodiment and the image display system will be described.

(Absorptive Linearly Polarizing Plate)

The first and second absorptive linearly polarizing plates are not particularly limited as long as they are absorptive linearly polarizing plates having a function of allowing transmission of linearly polarized light in one polarization direction and absorbing linearly polarized light in another polarization direction. For example, a well-known absorptive linearly polarizing plate in the related can be used.

As the absorptive linearly polarizing plate, for example, an iodine-based polarizer, a dye-based polarizer using a dichroic dye, or a polyene polarizer that is an absorbing polarizer can be used. As the iodine-based polarizer and the dye-based polarizer, any one of a coating type polarizer or a stretching type polarizer can be used. In particular, a polarizer prepared by absorbing iodine or a dichroic dye on polyvinyl alcohol and performing stretching is preferable.

In addition, examples of a method of obtaining a polarizer by performing stretching and dyeing on a laminated film in which a polyvinyl alcohol layer is formed on the substrate include methods described in JP5143918B, JP5048120B, JP4691205B, JP4751481B, and JP4751486B, and well-known techniques relating to the polarizers can be used.

As the absorbing polarizer, for example, a polarizer obtained by aligning a dichroic coloring agent using the aligning properties of liquid crystal without performing stretching is more preferable. The polarizer has many advantages in that, for example, the thickness can be significantly reduced to about 0.1 μm to 5 μm, cracks are not likely to initiate or thermal deformation is small during folding as described in JP2019-194685A, and even a polarizing plate having a high transmittance of higher than 50% has excellent durability as described in JP6483486B, and thermoformability is excellent. In addition, a polarizer that is transferred after peeling a support can also be used.

(Reflective Linearly Polarizing Plate)

The first and second reflective linearly polarizing plates are not particularly limited as long as they are reflective linearly polarizing plates having a function of allowing transmission of linearly polarized light in one polarization direction and reflecting linearly polarized light in another polarization direction. For example, a well-known reflective linearly polarizing plate in the related can be used.

As the reflective linearly polarizing plate, for example, a film obtained by stretching a layer including two polymers or a wire grid polarizer described in JP2011-053705A can be used. From the viewpoint of brightness, the film obtained by stretching the layer including polymers is preferable. As the commercially available product, for example, a reflective polarizer (trade name: APF) manufactured by 3M or a wire grid polarizer (trade name: WGF) manufactured by Asahi Kasei Corporation can be suitably used. Alternatively, a reflective linearly polarizing plate including a combination of a cholesteric liquid crystal film and a λ/4 plate may be used.

(Retardation Plate)

The first and second retardation plates are retardation plates that convert the phase of incident polarized light. The retardation plate is disposed such that a direction of a slow axis is adjusted depending on whether to convert incident polarized light into light similar to linearly polarized light or circularly polarized light. Specifically, the retardation plate may be disposed such that an angle of a slow axis with respect to a transmission axis of a linearly polarizing plate (an absorptive linearly polarizing plate or a reflective linearly polarizing plate) disposed adjacent thereto is +45° or −45°.

The retardation plate used in the present invention may be a monolayer type including one optically-anisotropic layer or a multilayer type including two or more optically-anisotropic layers having different slow axes. Examples of the multilayer type retardation plate include those described in WO13/137464A, WO2016/158300A, JP2014-209219A, JP2014-209220A, WO14/157079A, JP2019-215416A, and WO2019/160044A. However, the present invention is not limited to this example.

From the viewpoint of converting linearly polarized light into circularly polarized light or converting circularly polarized light into linearly polarized light, it is preferable that the retardation plate is a λ/4 plate.

The λ/4 plate is not particularly limited, and various well-known plates having a λ/4 function can be used. Specific examples of the λ/4 plate include those described in US2015/0277006A.

Specific examples of an aspect where the λ/4 plate 26 has a monolayer structure include a stretched polymer film and a retardation film where an optically-anisotropic layer having a λ/4 function is provided on a support. Examples of an aspect in which the λ/4 plate has a multi-layer structure include a broadband λ/4 plate in which a λ/4 plate and a λ/2 wave plate are laminated.

The thickness of the λ/4 plate is not particularly limited and is preferably 1 to 500 μm, more preferably 1 to 50 μm, and still more preferably 1 to 5 μm.

It is preferable that the retardation plate used in the present invention has reverse wavelength dispersibility. By having reverse wavelength dispersibility, a phase change in the retardation plate is ideal, and conversion between linearly polarized light and circularly polarized light is ideal. Accordingly, in a case where light is reflected from the reflective linearly polarizing plate and/or the reflective circularly polarizing plate, the light can be efficiently reflected, and thus the utilization efficiency of light is improved.

(Partially Reflecting Mirror)

The partially reflecting mirror is a semi-permeable optical member that specularly reflects a part of incidence light and allows transmission of the remaining light. The partially reflecting mirror may be a semi-permeable reflective material having no polarization selectivity or may be a reflective material having polarization selectivity. In a case where the partially reflecting mirror is a reflective material having polarization selectivity, polarized light to be reflected or transmitted may be linearly polarized light or circularly polarized light.

As the partially reflecting mirror, various well-known partially reflecting mirrors (half mirrors) can be used.

(Reflective Circularly Polarizing Plate)

The reflective circularly polarizing plate is a circularly polarizing plate that reflects circularly polarized light in one turning direction and allows transmission of circularly polarized light in another turning direction.

As the reflective circularly polarizing plate having selective reflectivity to circularly polarized light, a reflective circularly polarizing plate that includes a cholesteric liquid crystal layer obtained by immobilizing a cholesteric liquid crystalline phase can be used.

The cholesteric liquid crystal layer may be a monolayer configuration or a multilayer configuration including two or more layers. In a case where the cholesteric liquid crystal layer includes two or more layers, the two or more layers may be laminated and applied, may be laminated and bonded, or may be laminated and transferred, or these methods may be combined.

Here, as is well-known, the cholesteric liquid crystal layer has wavelength-selective reflectivity. The selective reflection center wavelength of the cholesteric liquid crystal layer may be set depending on the wavelength of the light emitted from the image display apparatus 52. In addition, in a case where the image display apparatus 52 displays a color image using light of RGB, the reflective circularly polarizing plate may be configured to include three cholesteric liquid crystal layers including a cholesteric liquid crystal layer that selectively reflects R light (red light), a cholesteric liquid crystal layer that selectively reflects G light (green light), and a cholesteric liquid crystal layer that selectively reflects B light (blue light). That is, it is preferable that the reflective circularly polarizing plate includes a plurality of cholesteric liquid crystal layers where selective reflection center wavelengths are different depending on the wavelength of the light emitted from the image display apparatus 52.

Figure 8:
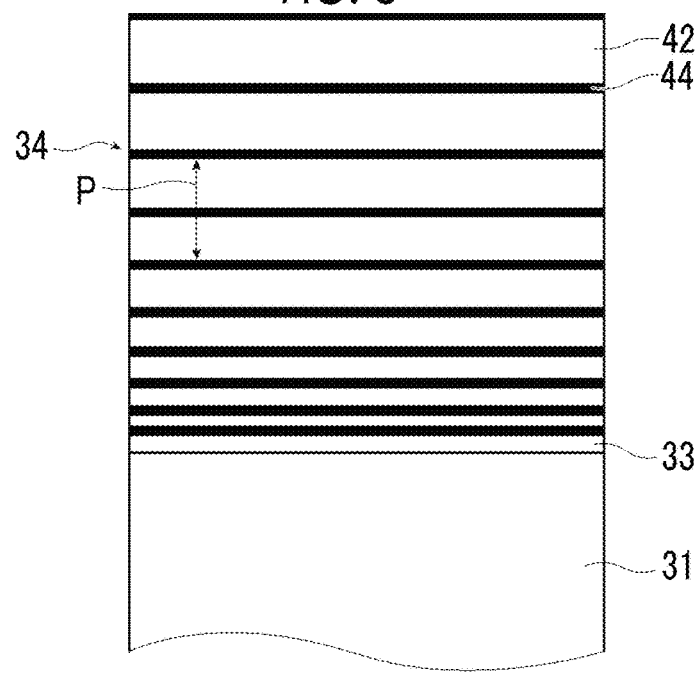
FIG. 8 is a diagram conceptually showing a cholesteric liquid crystal layer having a pitch gradient structure.

In addition, the cholesteric liquid crystal layer may have a pitch gradient structure. As is well-known, the selective reflection center wavelength of the cholesteric liquid crystal layer is determined depending on the pitch of the helical structure in the cholesteric liquid crystalline phase. The pitch gradient structure is a structure where the helical pitch changes in a thickness direction as shown in FIG. 8. FIG. 8 is a diagram schematically showing a stripe pattern where bright portions 42 and dark portions 44 seen in a case where a cross-section of the cholesteric liquid crystal layer is observed with a scanning electron microscope (SEM) are alternately arranged. The interval of the bright portions 42 and the interval P of the dark portions 44 correspond to the helical pitch.

Specifically, in FIG. 8, in a cholesteric liquid crystal layer 34, the helical pitch changes to gradually increase (or decrease) from one main surface side to another main surface side of the cholesteric liquid crystal layer 34. In the cholesteric liquid crystal layer 34, by changing the helical pitch P in the thickness direction, the selective reflection wavelength can be widened. Accordingly, in a case where the image display apparatus 52 emits light having two or more different wavelengths, light having a plurality of wavelengths can be reflected.

(Positive Lens)

The positive lens is a lens that collects incident light. As the positive lens, a well-known convex lens in the related art can be used.

In addition, as the positive lens, a diffraction element having a diffraction structure that collects light may be used. In this case, it is preferable that, as the diffraction element, any one of a surface relief type diffraction element, a volume hologram type diffraction element, or a polarization diffraction element is used. Examples of the polarization diffraction element include a liquid crystal diffraction element.

Figure 9:
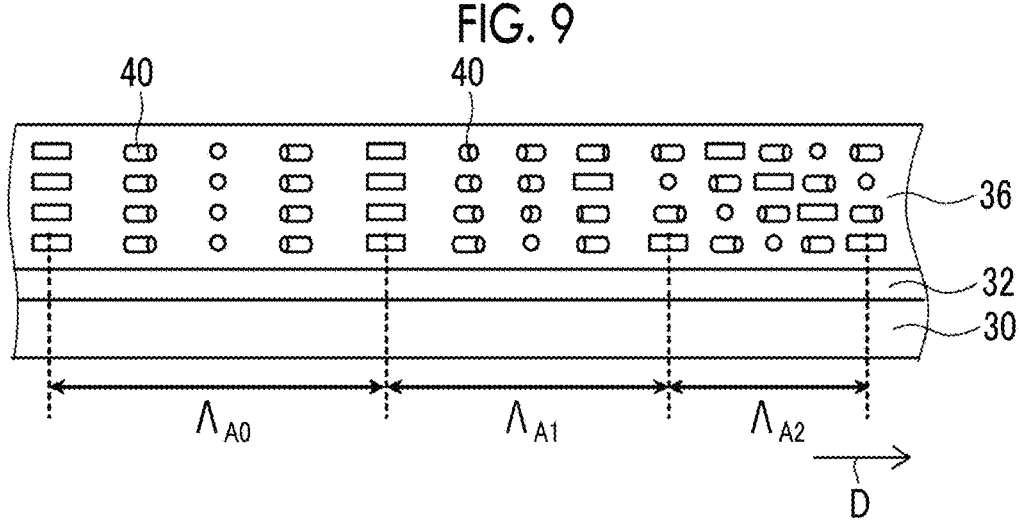
FIG. 9 is a diagram conceptually showing an example of a liquid crystal diffraction element.

For example, FIG. 9 is a conceptual diagram showing the positive lens including the liquid crystal diffraction element.

The liquid crystal diffraction element in the example shown in the drawing includes a support 30, an alignment film 32, and a liquid crystal layer (hereinafter, also referred to as "optically-anisotropic layer") 36.

The liquid crystal diffraction element includes a liquid crystal layer that is formed of a composition including a liquid crystal compound and has a predetermined liquid crystal alignment pattern in which an optical axis derived from the liquid crystal compound rotates. In addition, in the example shown in FIG. 9, the liquid crystal layer has regions where single periods Λ of the liquid crystal alignment pattern described below are different in a plane.

Although described below, the liquid crystal layer 36 exhibits an effect of diffracting circularly polarized light. Here, as shown in FIG. 2, the polarization state of light transmitted through the second reflective linearly polarizing plate 22 is linearly polarized light. Therefore, in a case where the liquid crystal diffraction element including the liquid crystal layer 36 is disposed downstream of the second reflective linearly polarizing plate 22 as the positive lens 29, a λ/4 plate needs to be disposed between the second reflective linearly polarizing plate 22 and the positive lens 29 to convert light incident into the positive lens 29 (liquid crystal layer 36) into circularly polarized light. In addition, in a case where the image display unit emits linearly polarized light, a λ/4 plate may be disposed between the positive lens 29 and the second absorptive linearly polarizing plate 24 to convert circularly polarized light transmitted through the positive lens 29 into linearly polarized light.

In addition, the liquid crystal diffraction element in the example shown in the drawing includes the support 30. However, the support 30 does not need to be provided.

For example, the optical element according to the embodiment of the present invention may include only the alignment film and the liquid crystal layer by peeling off the support 30 from the above-described configuration or may include only the liquid crystal layer by peeling off the support 30 and the alignment film from the above-described configuration.

That is, in the liquid crystal diffraction element, the liquid crystal layer can adopt various layer configurations as long as it has the liquid crystal alignment pattern in which the direction of the optical axis derived from the liquid crystal compound rotates in one direction.

<<Support>>

In the liquid crystal diffraction element, the support 30 supports the alignment film 32 and the liquid crystal layer 36.

As the support 30, various sheet-shaped materials (films or plate-shaped materials) can be used as long as they can support the alignment film and the liquid crystal layer.

As the support 30, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

In addition, the support 30 may have a multi-layer structure. Examples of the multi-layer support include a support including: one of the above-described supports having a single-layer structure that is provided as a substrate; and another layer that is provided on a surface of the substrate.

The thickness of the support 30 is not particularly limited and may be appropriately set depending on the use of the liquid crystal diffraction element, a material for forming the support 30, and the like in a range where the alignment film and the liquid crystal layer can be supported.

The thickness of the support 30 is preferably 1 to 1000 μm, more preferably 3 to 250 μm, and still more preferably 5 to 150 μm.

<<Alignment Film>>

In the liquid crystal diffraction element, the alignment film 32 is formed on a surface of the support 30.

The alignment film 32 is an alignment film for aligning a liquid crystal compound 40 to a predetermined liquid crystal alignment pattern during the formation of the liquid crystal layer 36 of the liquid crystal diffraction element.

Although described below, in the liquid crystal diffraction element, the liquid crystal layer has a liquid crystal alignment pattern in which a direction of an optical axis 40A (refer to FIG. 11) derived from the liquid crystal compound 40 changes while continuously rotating in one in-plane direction (arrangement axis D direction described below). Accordingly, the alignment film of the liquid crystal diffraction element is formed such that the liquid crystal layer can form this liquid crystal alignment pattern.

In addition, in the liquid crystal alignment pattern, a length over which the direction of the optical axis 40A rotates by 180° in the one in-plane direction in which the direction of the optical axis 40A changes while continuously rotating is set as a single period Λ (a rotation period of the optical axis).

In the following description, "the direction of the optical axis 40A rotates" will also be simply referred to as "the optical axis 40A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times. As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

In the liquid crystal diffraction element, the alignment film can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking ester, a cinnamate compound, or a chalcone compound is suitably used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 30; drying the applied alignment film; and exposing the alignment film to laser light to form an alignment pattern can be used.

Figure 15:
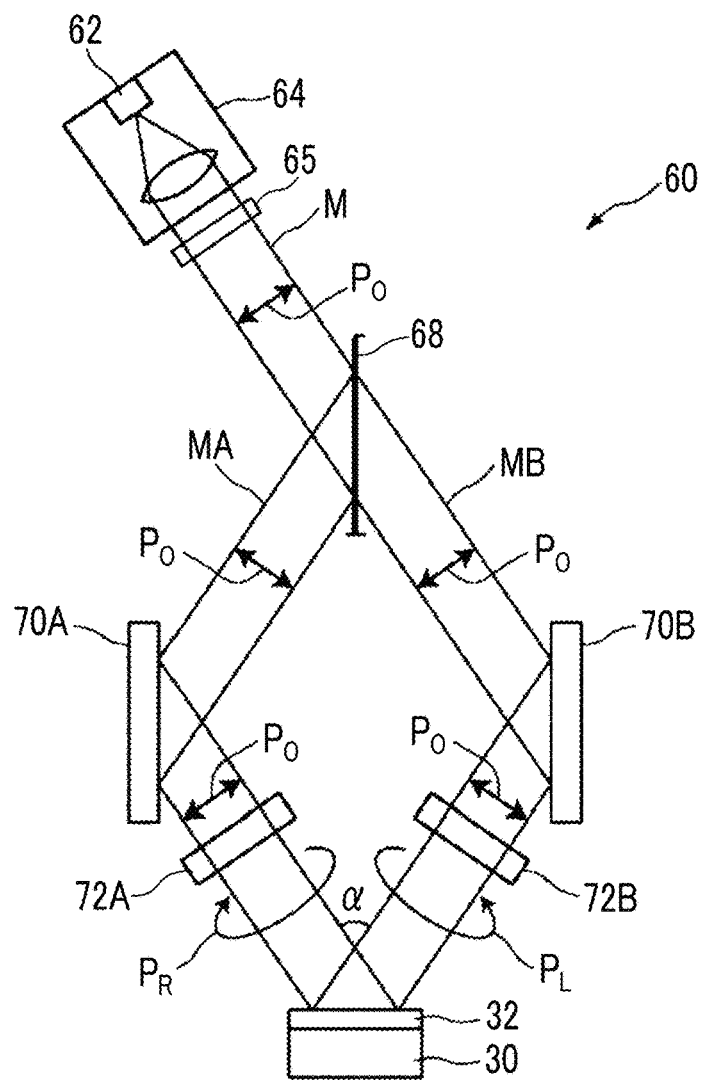
FIG. 15 is a diagram conceptually showing an example of an exposure device that exposes an alignment film of the liquid crystal diffraction element shown in FIG. 9.

FIG. 15 conceptually shows an example of an exposure device that exposes the alignment film to form an alignment pattern.

An exposure device 60 shown in FIG. 15 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 36 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the liquid crystal diffraction element, the alignment film is provided as a preferable aspect and is not an essential configuration requirement.

For example, the following configuration can also be adopted, in which, by forming the alignment pattern on the support 30 using a method of rubbing the support 30, a method of processing the support 30 with laser light or the like, the liquid crystal layer 36 or the like has the liquid crystal alignment pattern in which the direction of the optical axis 40A derived from the liquid crystal compound 40 changes while continuously rotating in at least one in-plane direction.

<<Liquid Crystal Layer>>

In the liquid crystal diffraction element, the liquid crystal layer 36 is formed on a surface of the alignment film 32.

Figure 12:
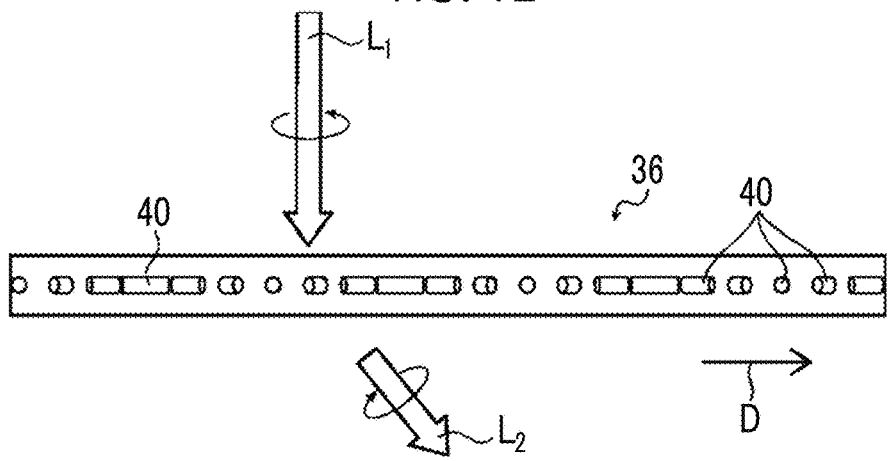
FIG. 12 is a conceptual diagram showing an action of the liquid crystal layer of the liquid crystal diffraction element shown in FIG. 9.
Figure 13:
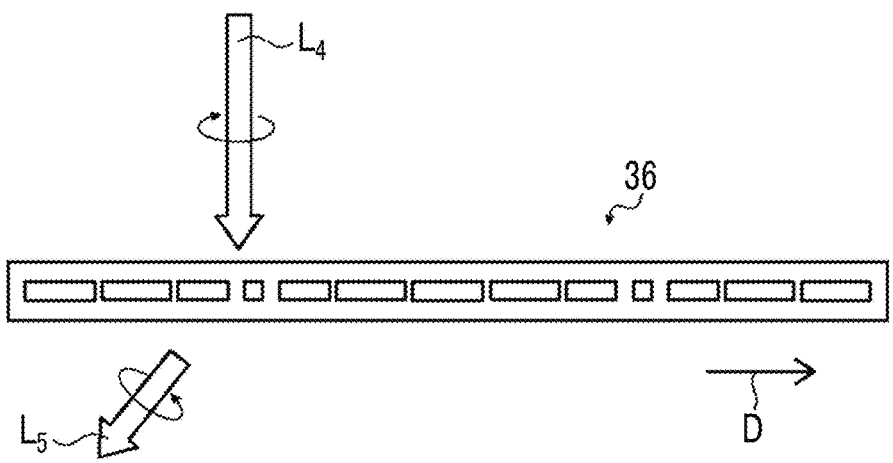
FIG. 13 is a conceptual diagram showing an action of the liquid crystal layer of the liquid crystal diffraction element shown in FIG. 9.

In FIG. 12 and FIG. 13 described below, in order to simplify the drawing and to clarify the configuration of the liquid crystal diffraction element, only the liquid crystal compound 40 (liquid crystal compound molecules) on the surface of the alignment film in the liquid crystal layer 36 is shown. However, as conceptually shown in FIG. 10, the liquid crystal layer 36 has a structure in which the aligned liquid crystal compounds 30 are laminated as in a liquid crystal layer that is formed of a composition including a typical liquid crystal compound.

As described above, in the liquid crystal diffraction element, the liquid crystal layer 36 is formed of the liquid crystal composition including the liquid crystal compound.

In a case where an in-plane retardation value is set as λ/2, the liquid crystal layer has a function of a general λ/2 plate, that is, a function of imparting a phase difference of a half wavelength, that is, 180° to two linearly polarized light components in light incident into the liquid crystal layer and are perpendicular to each other.

Here, since the liquid crystal compound rotates to be aligned in a plane direction, the liquid crystal layer diffracts (refracts) incident circularly polarized light to be transmitted in a direction in which the direction of the optical axis continuously rotates. In this case, the diffraction direction varies depending on the turning direction of incident circularly polarized light.

That is, the liquid crystal layer allows transmission of circularly polarized light and diffracts this transmitted light.

In addition, the liquid crystal layer changes a turning direction of the transmitted circularly polarized light into an opposite direction.

The liquid crystal layer has the liquid crystal alignment pattern in which the direction of the optical axis derived from the liquid crystal compound changes while continuously rotating in the one in-plane direction indicated by arrangement axis D in a plane of the optically-anisotropic layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is along a rod-like major axis direction.

In the following description, "one in-plane direction indicated by the arrangement axis D" will also be simply referred to as "arrangement axis D direction". In addition, in the following description, the optical axis 40A derived from the liquid crystal compound 40 will also be referred to as "the optical axis 40A of the liquid crystal compound 40" or "the optical axis 40A".

In the liquid crystal layer, the liquid crystal compound 40 is two-dimensionally aligned in a plane parallel to the arrangement axis D direction and a Y direction perpendicular to the arrangement axis D direction. In FIGS. 9 and 10 and FIGS. 12 to 14 described below, the Y direction is a direction perpendicular to the paper plane.

Figure 11:
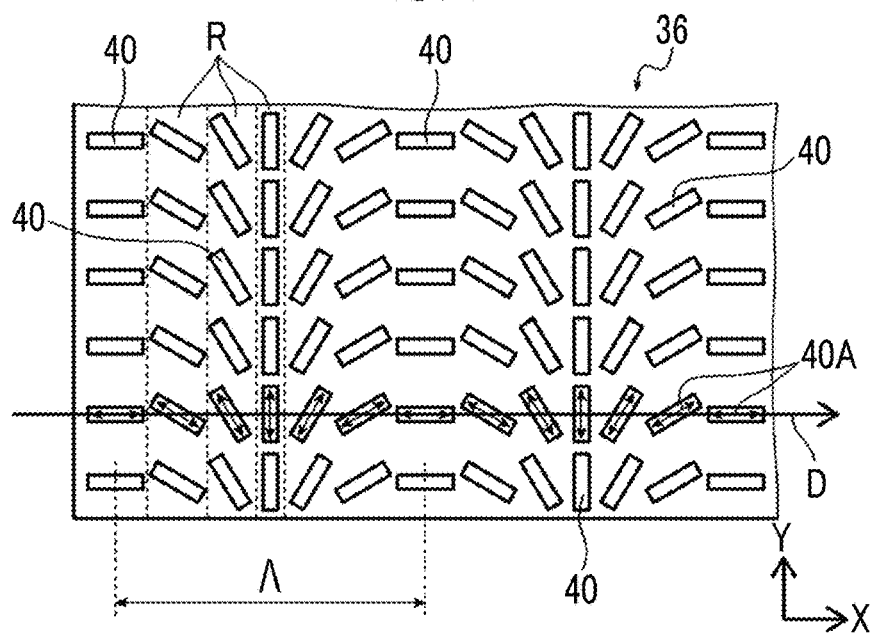
FIG. 11 is a plan view showing the liquid crystal layer of the liquid crystal diffraction element shown in FIG. 9.

FIG. 11 conceptually shows a plan view of the liquid crystal layer 36.

The plan view is a view in a case where the liquid crystal diffraction element is seen from the top in FIG. 9, that is, a view in a case where the liquid crystal diffraction element is seen from a thickness direction (laminating direction of the respective layers (films)). In other words, the plan view is a view in a case where the liquid crystal layer 36 is seen from a direction perpendicular to a main surface.

Figure 10:
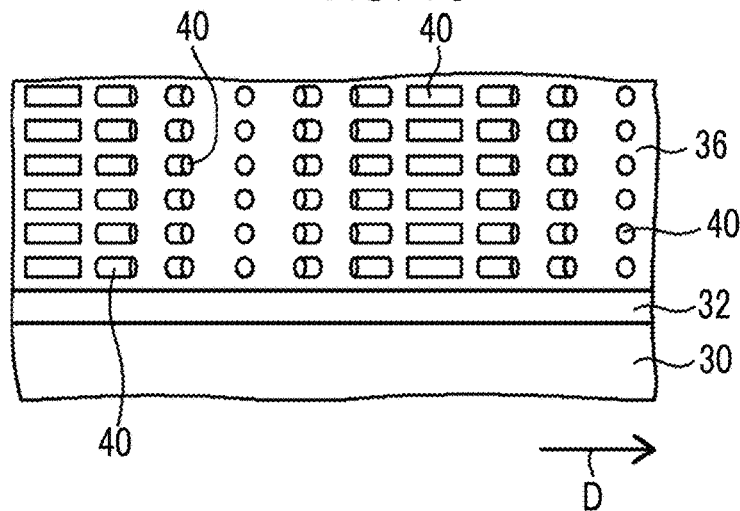
FIG. 10 is a diagram conceptually showing a liquid crystal layer of the liquid crystal diffraction element shown in FIG. 9.

In addition, in FIG. 11, in order to clarify the configuration of the liquid crystal diffraction element, only the liquid crystal compound 40 on the surface of the alignment film 32 is shown. However, in the thickness direction, as shown in FIG. 10, the liquid crystal layer 36 has the structure in which the liquid crystal compound 40 is laminated on the surface of the alignment film 32 as described above.

In FIG. 11, a part in a plane of the liquid crystal layer 36 will be described as a representative example. However, basically, the liquid crystal layer described below also has the same configuration and the same effects as those of the liquid crystal layer 36, except that the lengths (single periods Λ) of the single periods of the liquid crystal alignment patterns described below are different from each other.

The liquid crystal layer 36 has the liquid crystal alignment pattern in which the direction of the optical axis 40A derived from the liquid crystal compound 40 changes while continuously rotating in the arrangement axis D direction in a plane of the liquid crystal layer 36.

Specifically, "the direction of the optical axis 40A of the liquid crystal compound 40 changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than 15°.

On the other hand, regarding the liquid crystal compound 40 forming the liquid crystal layer 36, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal diffraction element, in the liquid crystal alignment pattern of the liquid crystal compound 40, the length (distance) over which the direction of the optical axis 40A of the liquid crystal compound 40 rotates by 180° in the arrangement axis D direction in which the optical axis 40A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 40A of the liquid crystal compound 40 and the arrangement axis D direction.

That is, a distance between centers of two liquid crystal compounds 40 in the arrangement axis D direction is the length Λ of the single period, the two liquid crystal compounds having the same angle in the arrangement axis D direction. Specifically, as shown in FIG. 11, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal diffraction element, in the liquid crystal alignment pattern of the liquid crystal layer, the single period Λ is repeated in the arrangement axis D direction, that is, in the one in-plane direction in which the direction of the optical axis 40A changes while continuously rotating.

As described above, in the liquid crystal compounds arranged in the Y direction in the liquid crystal layer, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the liquid crystal layer. Here, the difference in refractive index generated by refractive index anisotropy of the region R in the liquid crystal layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound.

In a case where circularly polarized light is incident into the above-described liquid crystal layer 36, the light is refracted such that the direction of the circularly polarized light is converted.

This action is conceptually shown in FIGS. 12 and 13. In the liquid crystal layer 36, the value of the product of the difference in refractive index of the liquid crystal compound and the thickness of the liquid crystal layer 36 is λ/2.

As shown in FIG. 12, in a case where the value of the product of the difference in refractive index of the liquid crystal compound in the liquid crystal layer 36 and the thickness of the optically-anisotropic layer is λ/2 and incidence light $L_1$ as left circularly polarized light is incident into the liquid crystal layer 36, the incidence light $L_1$ transmits through the liquid crystal layer 36 to be imparted with a retardation of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 13, in a case where the value of the product of the difference in refractive index of the liquid crystal compound in the liquid crystal layer 36 and the thickness of the liquid crystal layer 36 is λ/2 and incidence light $L_4$ of right circularly polarized light is incident into the liquid crystal layer 36, the incidence light $L_4$ transmits through the liquid crystal layer 36 to be imparted with a retardation of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

By changing the single period Λ of the liquid crystal alignment pattern formed in the liquid crystal layer 36, refraction angles of the transmitted light components $L_2$ and $L_5$ can be adjusted. Specifically, even in the liquid crystal layer 36, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 12 and 13, the rotation direction of the optical axis 40A toward the arrangement axis D direction is clockwise. By setting this rotation direction to be counterclockwise, the refraction direction of transmitted light can be reversed.

In the liquid crystal layer 36, it is preferable that the in-plane retardation value of the plurality of regions R is a half wavelength. It is preferable that an in-plane retardation $Re(550)=\Delta n_{550} \times d$ of the plurality of regions R of the liquid crystal layer 36 with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the liquid crystal layer 36.

$$200 \text{ nm} \leq \Delta n_{550} \times d \leq 350 \text{ nm} \tag{1}$$

That is, in a case where the in-plane retardation Re(550) $=\Delta n_{550} \times d$ of the plurality of regions R of the liquid crystal layer 36 satisfies Expression (1), a sufficient amount of a circularly polarized light component in light incident into the liquid crystal layer 36 can be converted into circularly polarized light that travels in a direction tilted in a forward direction or reverse direction with respect to the arrangement axis D direction. It is more preferable that the in-plane retardation $Re(550)=\Delta n_{550} \times d$ satisfies 225 nm$\leq\Delta n_{550} \times d \leq$340 nm, and it is still more preferable that the in-plane retardation $Re(550)=\Delta n_{550} \times d$ satisfies 250 nm$\leq\Delta n_{550} \times d \leq$330 nm.

Expression (1) is a range with respect to incidence light having a wavelength of 550 nm. However, an in-plane retardation $Re(\lambda)=\Delta n_\lambda \times d$ of the plurality of regions R of the liquid crystal layer with respect to incidence light having a wavelength of λ nm is preferably in a range defined by the following Expression (1-2) and can be appropriately set.

$$0.7 \times (\lambda/2) \text{ nm} \leq \Delta n_\lambda \times d \leq 1.3 \times (\lambda/2) \text{ nm} \tag{1-2}$$

In addition, the value of the in-plane retardation of the plurality of regions R of the liquid crystal layer 36 in a range outside the range of Expression (1) can also be used. Specifically, by satisfying $\Delta n_{550} \times d$<200 nm or 350 nm<$\Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450) = \Delta n_{450} \times d$ of each of the plurality of regions R of the liquid crystal layer 36 with respect to incidence light having a wavelength of 450 nm and an in-plane retardation $Re(550) = \Delta n_{550} \times d$ of each of the plurality of regions R of the liquid crystal layer 36 with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \quad (2)$$

Expression (2) represents that the liquid crystal compound 40 in the liquid crystal layer 36 has reverse dispersion properties. That is, by satisfying Expression (2), the liquid crystal layer 36 can correspond to incidence light having a wide range of wavelength.

The liquid crystal layer is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

By forming an alignment film on the support 30, applying the liquid crystal composition to the alignment film, and curing the applied liquid crystal composition, the liquid crystal layer consisting of the cured layer of the liquid crystal composition can be obtained. Although the liquid crystal layer functions as a so-called λ/2 plate, the present invention includes an aspect where a laminate including the support 30 and the alignment film that are integrated functions as a λ/2 plate.

In addition, the liquid crystal composition for forming the liquid crystal layer includes a rod-like liquid crystal compound or a disk-like liquid crystal compound and may further include other components such as a leveling agent, an alignment control agent, a polymerization initiator, or an alignment assistant.

In addition, it is preferable that the liquid crystal layer has a wide range for the wavelength of incidence light and is formed of a liquid crystal material having a reverse birefringence index dispersion. In addition, it is also preferable that the liquid crystal layer can be made to have a substantially wide range for the wavelength of incidence light by imparting a twist component to the liquid crystal composition or by laminating different retardation layers. For example, in the liquid crystal layer, a method of realizing a λ/2 plate having a wide-range pattern by laminating two liquid crystal layers having different twisted directions is disclosed in, for example, JP2014-089476A and can be preferably used in the present invention.

Rod-Like Liquid Crystal Compound

As the rod-like liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-like liquid crystal compound, not only the above-described low molecular weight liquid crystal molecules but also high molecular weight liquid crystal molecules can be used.

It is preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-64627. Further, as the rod-like liquid crystal compound, for example, compounds described in JP1999-513019A (JP-H11-513019A) and JP2007-279688A can also be preferably used.

Disk-Like Liquid Crystal Compound

As the disk-like liquid crystal compound, for example, compounds described in JP2007-108732A and JP2010-244038A can be preferably used.

In a case where the disk-like liquid crystal compound is used in the liquid crystal layer, the liquid crystal compound 40 rises in the thickness direction in the liquid crystal layer, and the optical axis 40A derived from the liquid crystal compound is defined as an axis perpendicular to a disc plane, that is so-called, a fast axis.

<Effect of Optical Element>

As described above, the liquid crystal layer that is formed using the composition including the liquid crystal compound and has the liquid crystal alignment pattern in which the direction of the optical axis 40A rotates in the arrangement axis D direction refracts circularly polarized light, in which as the single periods Λ of the liquid crystal alignment pattern decreases, the refraction angle is large.

Therefore, as shown in FIG. 9, in a case where a pattern is formed such that the single periods Λ of the liquid crystal alignment patterns are different from each other in different in-plane regions, light that is incident into the different in-plane regions is refracted at different angles.

Hereinafter, the action of the liquid crystal diffraction element will be described in detail with reference to the conceptual diagrams of FIG. 14.

In the liquid crystal diffraction element, basically, only the liquid crystal layer exhibits an optical action. Therefore, in order to simplify the drawing and to clarify the configuration and the effects, in FIG. 14, the liquid crystal diffraction element exhibits only the liquid crystal layer 36.

As described above, the liquid crystal diffraction element includes the liquid crystal layer 36.

For example, the liquid crystal diffraction element refracts circularly polarized light as incidence light to be transmitted in a predetermined direction. In FIG. 14, the incidence light is left circularly polarized light.

Figure 14:
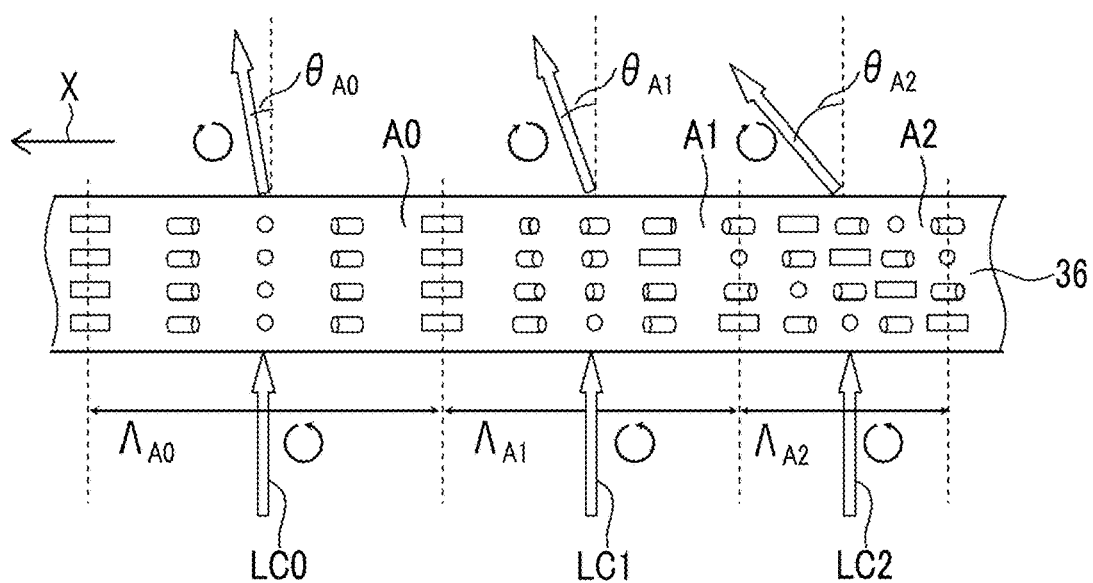
FIG. 14 is a conceptual diagram showing an action of the liquid crystal diffraction element shown in FIG. 9.

In the portion shown in FIG. 14, a liquid crystal layer 26A includes three regions A0, A1, and A2 in order from the left side in FIG. 14, and the respective regions have different lengths Λ of single periods. Specifically, the length Λ of the single period decreases in order from the regions A0, A1, and A2. In addition, the regions A1 and A2 have a structure (hereinafter, also referred to as "twisted structure") in which the optical axis is twisted in the thickness direction of the liquid crystal layer and rotates. The twist angle of the region A1 in the thickness direction is less than the twist angle of the region A2 in the thickness direction. The region A0 is a region not having the twisted structure (that is, the twist angle is 0°).

The twist angle is a twist angle in the entire thickness direction.

In a case where the liquid crystal layer has the twisted structure, in a cross-section observed with an SEM, bright portions and dark portions are tilted with respect to a main surface of the liquid crystal layer.

In the liquid crystal diffraction element, in a case where left circularly polarized light LC1 is incident into the in-plane region A1 of the liquid crystal layer 36, as described above, the left circularly polarized light LC1 is refracted and transmitted at a predetermined angle in the arrangement axis D direction with respect to the incidence direction, that is, in the one in-plane direction in which the direction of the optical axis of the liquid crystal compound changes while continuously rotating. Likewise, in a case where left circularly polarized light LC2 is incident into the in-plane region A2 of the liquid crystal layer 36, the left circularly polarized light LC2 is refracted and transmitted at a predetermined angle in the arrangement axis D direction with respect to the incidence direction. Likewise, in a case where left circularly polarized light LC0 is incident into the in-plane region A0 of the liquid crystal layer 36, the left circularly polarized light LC0 is refracted and transmitted at a predetermined angle in the arrangement axis D direction with respect to the incidence direction.

Regarding the refraction angles from the liquid crystal layer 36, since a single period $\Lambda_{A2}$ of the liquid crystal alignment pattern of the region A2 is shorter than a single period $\Lambda_{A1}$ of the liquid crystal alignment pattern of the region A1, as shown in FIG. 14, a refraction angle $\theta_{A2}$ of transmitted light of the region A2 is more than a refraction angle $\theta_{A1}$ of transmitted light of the region A1 with respect to the incidence light. In addition, since a single period $\Lambda_{A0}$ of the liquid crystal alignment pattern of the region A0 is longer than the single period $\Lambda_{A1}$ of the liquid crystal alignment pattern of the region A1, as shown in FIG. 14, a refraction angle $\theta_{A0}$ of transmitted light of the region A0 is less than the refraction angle $\Lambda_{A1}$ of transmitted light of the region A1 with respect to the incidence light.

With the configuration in which the liquid crystal alignment pattern Λ of the region decreases from the center side of the liquid crystal diffraction element to an end part thereof, light incident into the end part side can be refracted more than light incident into the vicinity of the center of the liquid crystal diffraction element, and a function as a positive lens that focuses light can be exhibited.

Here, in the diffraction of light by the liquid crystal layer having the liquid crystal alignment pattern in which the direction of the optical axis of the liquid crystal compound changes while continuously rotating in a plane, in a case where the diffraction angle increases, the diffraction efficiency may decrease.

Therefore, in a case where the liquid crystal layer has regions having different lengths of the single periods over which the direction of the optical axis of the liquid crystal compound rotates by 180° in a plane, the diffraction angle varies depending on light incidence positions. Therefore, there may be a difference in the amount of diffracted light depending on in-plane incidence positions. That is, a region where the brightness of light transmitted and diffracted may be low depending on in-plane incidence positions is present.

On the other hand, in the liquid crystal diffraction element, in a case where the liquid crystal layer has regions in which the optical axis is twisted in the thickness direction and rotates, a decrease in the diffraction efficiency of refracted light can be suppressed. Accordingly, in the liquid crystal diffraction element, it is preferable that the liquid crystal layer has regions in which the optical axis is twisted in a thickness direction of the optically-anisotropic layer and rotates, the regions having different magnitudes of twist angles in the thickness direction.

Specifically, by setting the twist angle in the thickness direction to be large in the region where the length of the single period Λ of the liquid crystal alignment pattern is short, the amounts of light reflected can be made to be uniform irrespective of in-plane incidence positions.

In addition, in the liquid crystal diffraction element, it is preferable that the optically-anisotropic layer has a region in which the magnitudes of the twist angles in the thickness direction are 10° to 360°.

In the liquid crystal diffraction element, the twist angle in the thickness direction may be appropriately set according to the single period Λ of the liquid crystal alignment pattern in a plane.

Here, in the example shown in FIG. 9, the liquid crystal diffraction element includes one liquid crystal layer, but the present invention is not limited thereto. The optical element may include two or more liquid crystal layers.

In addition, in a case where the liquid crystal diffraction element includes two or more liquid crystal layers the optical element may further include liquid crystal layers having different directions (directions of the twist angle) in which the optical axis is twisted in the thickness direction and rotates.

For example, liquid crystal layers may be laminated to be used, in which each of the liquid crystal layers has a liquid crystal alignment pattern in which a direction of an optical axis derived from a liquid crystal compound rotates in one in-plane direction, each of the liquid crystal layers has regions in which the optical axis is twisted in a thickness direction of the liquid crystal layer and rotates, the regions having different magnitudes of twist angles of the rotation in a plane, and the liquid crystal layers have different directions in which the optical axis is twisted in the thickness direction and rotates.

This way, in a case where the optical element further includes liquid crystal layers having different directions in which the optical axis is twisted in the thickness direction and rotates, transmitted light of incidence light having various polarization states can be efficiently refracted in a region having a twist angle in the thickness direction.

Here, in a case where the optical element includes liquid crystal layers having different directions in which the optical axis is twisted in the thickness direction and rotates, it is preferable that in-plane regions have the same twist angle in the thickness direction.

However, the present invention is not limited to this configuration. In the liquid crystal diffraction element, the twist angle in the thickness direction is not particularly limited and may be appropriately set according to the use of the optical element or the like.

In addition, in the liquid crystal layers having different directions in which the optical axis is twisted in the thickness direction and rotates, it is preferable that in-plane retardations Re(λ)=Δn$_λ$×d of the plurality of regions R of the liquid crystal layer with respect to incidence light having a wavelength of λ nm are the same.

However, the present invention is not limited to this configuration, and in the liquid crystal diffraction element, the in-plane retardation Re(λ)=Δn$_λ$×d of the plurality of regions R of the liquid crystal layer with respect to incidence light having a wavelength of λ nm is not particularly limited and may be appropriately set depending on the use of the optical element and the like.

In the liquid crystal diffraction element, the single period Λ in the alignment pattern of the liquid crystal layer is not particularly limited and may be appropriately set depending on the use of the optical element and the like.

(Method of Forming Regions having different Twist Angles of Twisted Structure)

In the configuration in which the liquid crystal layer has regions having different twist angles of the twisted structure, the chiral agent in which back isomerization, dimerization, isomerization, dimerization or the like occurs during light irradiation such that the helical twisting power (HTP) changes is used. By irradiating the liquid crystal composition with light having a wavelength at which the HTP of the chiral agent changes before or during the curing of the liquid crystal composition for forming the liquid crystal layer while changing the irradiation dose for each of the regions, the regions having different helical pitches can be formed.

For example, by using a chiral agent in which the HTP decreases during light irradiation, the HTP of the chiral agent decreases during light irradiation. Here, by changing the irradiation dose of light for each of the regions, for example, in a region that is irradiated with the light at a high irradiation dose, the decrease in HTP is large, the induction of helix is small, and thus the twist angle of the twisted structure decreases. On the other hand, in a region that is irradiated with the light at a low irradiation dose, a decrease in HTP is small, and thus the twist angle of the twisted structure is large.

The method of changing the irradiation dose of light for each of the regions is not particularly limited, and a method of irradiating light through a gradation mask, a method of changing the irradiation time for each of the regions, or a method of changing the irradiation intensity for each of the regions can be used.

The gradation mask refers to a mask in which a transmittance with respect to light for irradiation changes in a plane.

In the optical elements shown in FIGS. 9 to 14, the optical axis 40A of the liquid crystal compound 40 in the liquid crystal alignment pattern of the liquid crystal layer continuously rotates only in the arrangement axis D direction.

However, the present invention is not limited thereto, and various configurations can be used as long as the optical axis 40A of the liquid crystal compound 40 in the liquid crystal layer continuously rotates in the one in-plane direction.

Figure 16:
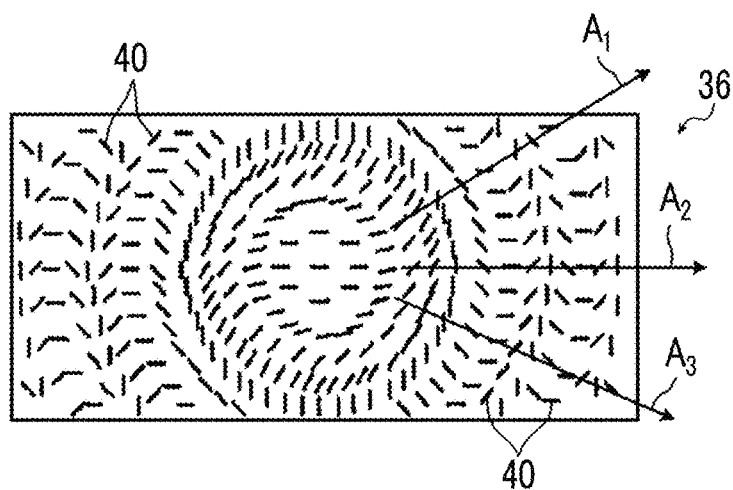
FIG. 16 is a plan view showing another example of the liquid crystal layer of the liquid crystal diffraction element.

For example, a liquid crystal layer 36 conceptually shown in a plan view of FIG. 16 can be used, in which a liquid crystal alignment pattern is a concentric circular pattern having a concentric circular shape where the one in-plane direction in which the direction of the optical axis of the liquid crystal compound 40 changes while continuously rotating moves from an inner side toward an outer side. In other words, the liquid crystal alignment pattern of the liquid crystal layer 36 shown in FIG. 16 is a liquid crystal alignment pattern where the one in-plane direction in which the direction of the optical axis of the liquid crystal compound 40 changes while continuously rotating is provided in a radial shape from the center of the liquid crystal layer 34.

FIG. 16 shows only the liquid crystal compound 40 of the surface of the alignment film as in FIG. 12. However, as in the example shown in FIG. 10, the liquid crystal layer 36 has the structure in which the liquid crystal compound 40 on the surface of the alignment film is laminated as described above.

In the liquid crystal layer 36 shown in FIG. 16, the optical axis (not shown) of the liquid crystal compound 40 is a longitudinal direction of the liquid crystal compound 40.

In the liquid crystal layer 36, the direction of the optical axis of the liquid crystal compound 40 changes while continuously rotating in a direction in which a large number of optical axes move to the outer side from the center of the liquid crystal layer 36, for example, a direction indicated by an arrow A1, a direction indicated by an arrow A2, a direction indicated by an arrow A3, or . . . .

In circularly polarized light incident into the liquid crystal layer 36 having the above-described liquid crystal alignment pattern, the absolute phase changes depending on individual local regions having different directions of optical axes of the liquid crystal compound 40. In this case, the amount of change in absolute phase varies depending on the directions of the optical axes of the liquid crystal compound 40 into which circularly polarized light is incident.

This way, in the liquid crystal layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 40 and the direction of circularly polarized light to be incident.

That is, by setting the liquid crystal alignment pattern of the liquid crystal layer in a concentric circular shape, the liquid crystal diffraction element exhibits, for example, a function as a convex lens or a concave lens.

Here, in a case where the liquid crystal alignment pattern of the liquid crystal layer is concentric circular such that the optical element functions as a convex lens, it is preferable that the length of the single period Λ over which the optical axis rotates by 180° in the liquid crystal alignment pattern gradually decreases from the center of the liquid crystal layer 34 toward the outer direction in the one in-plane direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the liquid crystal layer 34 toward the outer direction in the one in-plane direction in which the optical axis continuously rotates. As a result, the light collecting power of the liquid crystal layer 34 can be improved, and the performance as a convex lens can be improved.

In the present invention, in a case where the liquid crystal diffraction element is made to function as a convex lens, it is preferable that the liquid crystal diffraction element satisfies the following expression.

$$\Phi(r) = (\pi/\lambda)\left[(r^2 + f^2)^{1/2} - f\right]$$

Here, r represents a distance from the center of a concentric circle and is represented by the following expression "$r=(x^2+y^2)^{1/2}$". x and y represent in-plane positions, and (x,y)=(0,0) represents the center of the concentric circle. Φ(r) represents an angle of the optical axis at the distance r from the center, λ represents a wavelength, and f represents a desired focal length.

In the present invention, conversely, the length of the single period Λ in the concentric circular liquid crystal alignment pattern may gradually increase from the center of the liquid crystal layer 36 toward the outer direction in the one in-plane direction in which the optical axis continuously rotates.

Further, depending on the uses of the liquid crystal diffraction element such as a case where it is desired to provide a light amount distribution in transmitted light, a configuration in which regions having partially different lengths of the single periods Λ in the one in-plane direction in which the optical axis continuously rotates are provided can also be used instead of the configuration in which the length of the single period Λ gradually changes in the one in-plane direction in which the optical axis continuously rotates.

Further, the liquid crystal diffraction element may include: a liquid crystal layer in which the single period Λ is homogeneous over the entire surface; and a liquid crystal layer in which regions having different lengths of the single periods Λ are provided. Regarding this point, the same can also be applied to the configuration shown in FIG. 9 in which the optical axis continuously rotates only in the one in-plane direction.

Figure 17:
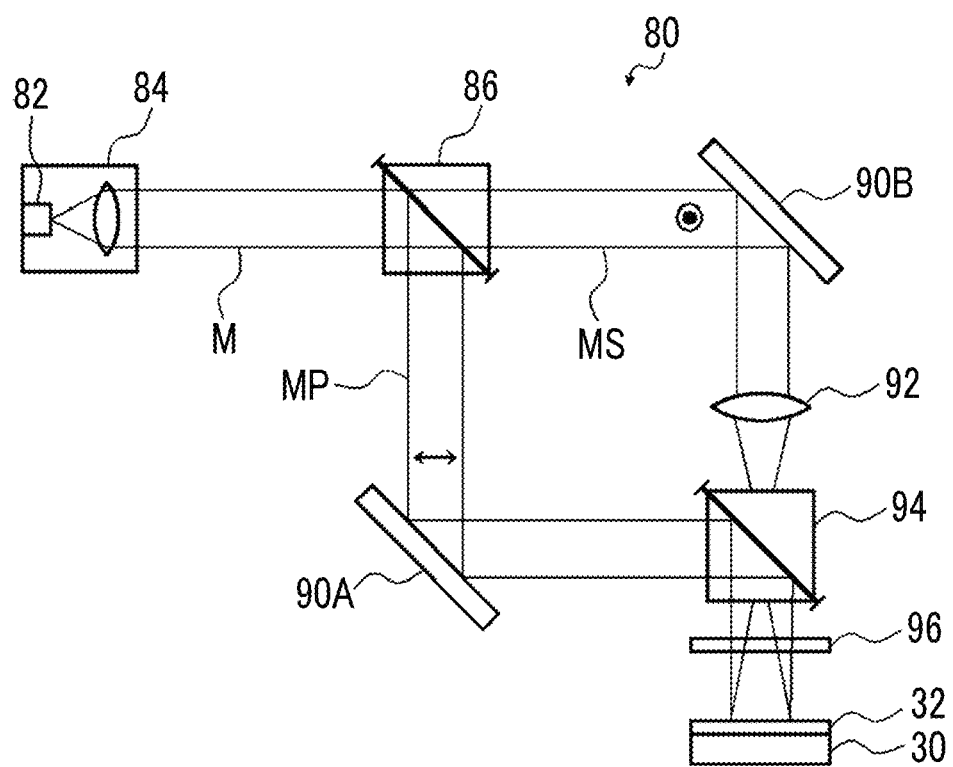
FIG. 17 is a diagram conceptually showing one example of an exposure device that exposes an alignment film forming the liquid crystal layer shown in FIG. 16.

FIG. 17 conceptually shows an example of an exposure device that forms the concentric circular alignment pattern in the alignment film.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film is irradiated periodically changes according to interference fringes. The intersecting angle between the right circularly polarized light and the left circularly polarized light changes from the inner side to the outer side of the concentric circle. Therefore, an exposure pattern in which the pitch changes from the inner side to the outer side can be obtained. As a result, in the alignment film, a concentric circular alignment pattern in which the alignment state periodically changes can be obtained.

In the exposure device 80, the single period Λ in the liquid crystal alignment pattern in which the optical axis of the liquid crystal compound 40 continuously rotates by 180° in the one in-plane direction can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length Λ of the single period in the liquid crystal alignment pattern in the one in-plane direction in which the optical axis continuously rotates can be changed.

Specifically, In addition, the length Λ of the single period in the liquid crystal alignment pattern in the one in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inner side toward the outer side, and the F number increases. Conversely, in a case where the refractive power of the lens 92 becomes stronger, the length Λ of the single period in the liquid crystal alignment pattern rapidly decreases from the inner side toward the outer side, and the F number decreases.

This way, the configuration of changing the length of the single period Λ over which the optical axis rotates by 180° in the one in-plane direction in which the optical axis continuously rotates can also be used in the configuration shown in FIGS. 9 to 14 in which the optical axis 40A of the liquid crystal compound 40 changes while continuously rotating only in the one in-plane direction as the arrangement axis D direction.

For example, by gradually decreasing the single period Λ of the liquid crystal alignment pattern in the arrangement axis D direction, an optical element that allows transmission of light to be collected can be obtained.

Further, depending on the uses of the liquid crystal diffraction element such as a case where it is desired to provide a light amount distribution in transmitted light, a configuration in which regions having partially different lengths of the single periods Λ in the arrangement axis D direction are provided can also be used instead of the configuration in which the length of the single period Λ gradually changes in the arrangement axis D direction. For example, as a method of partially changing the single period Λ, for example, a method of scanning and exposing the photo-alignment film to be patterned while freely changing a polarization direction of laser light to be gathered can be used.

(Adhesive Layer)

In order to ensure adhesiveness between the layers, the optical element according to the embodiment of the present invention may include an adhesive layer between the layers.

In the present specification, "adhesive" is used as a concept including "pressure-sensitive adhesive".

The adhesive layer may be formed of an adhesive or a pressure sensitive adhesive.

From the viewpoint a curing type, as the adhesive, a hot melt type, a thermally curing type, a photocuring type, a reactive curing type, or a pressure sensitive adhesion type that does not require curing can be used. As a material of each of the types, a compound such as a urethane, a urethane acrylate, an epoxy, an epoxy acrylate, a polyolefin, a modified olefin, polypropylene, an ethylene vinyl alcohol, a vinyl chloride, a chloroprene rubber, a cyano acrylate, a polyamide, a polyimide, a polystyrene, or a polyvinyl butyral can be used. From the viewpoints of workability and productivity, a photocuring type is preferable as the curing type. From the viewpoints of optical transparency and heat resistance, as the material, an acrylate, a urethane acrylate, an epoxy acrylate is preferably used.

Examples of the adhesive include an acrylic pressure sensitive adhesive and a polyvinyl alcohol adhesive.

The adhesion between the layers may be performed using a highly transparent adhesive transfer tape (OCA tape). As the highly transparent adhesive transfer tape, a commercially available product for an image display apparatus, in particular, a commercially available product for a surface of an image display unit of an image display apparatus may be used. Examples of the commercially available product include a pressure-sensitive adhesive sheet (for example, PD-S1) manufactured by PANC Corporation and a pressure-sensitive adhesive sheet of MHM series manufactured by Nichieikako Co., Ltd.

In addition, each of the members may be directly laminated on another member. For example, the cholesteric liquid crystal layer such as the first reflective circularly polarizing plate may be formed on the first retardation plate by using the first retardation plate as a support.

In the image display unit including the optical element according to the embodiment of the present invention described above, the optical path length can increase while maintaining a small size. Therefore, the image display unit can be suitably used as an image display unit of a head-mounted display.

Examples

Hereinafter, the characteristics of the present invention will be described in detail using Examples and Comparative Examples. Materials, used amounts, ratios, treatment details, treatment procedures, and the like shown in the following examples can be appropriately changed within a range not departing from the scope of the present invention. Accordingly, the scope of the present invention is not limited to the following specific examples.

<Preparation of Second Reflective Circularly Polarizing Plate>

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

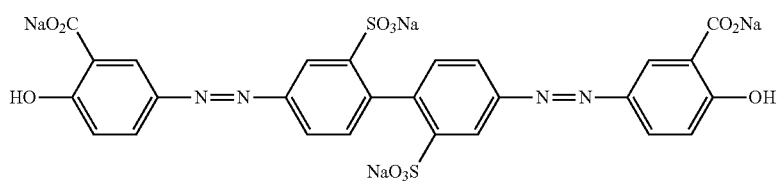

(Exposure of Alignment Film)

By irradiating the obtained alignment film P-1 with polarized ultraviolet light (50 mJ/cm$^2$, using an extra high pressure mercury lamp), the alignment film P-1 was exposed.

(Formation of Cholesteric Liquid Crystal Layer)

As the liquid crystal composition forming the cholesteric liquid crystal layer, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-like liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 4.0 parts by mass |
| Leveling agent T-1 | 0.08 parts by mass |
| Methyl ethyl ketone | 142.00 parts by mass |

Rod-Like Liquid Crystal Compound L-1

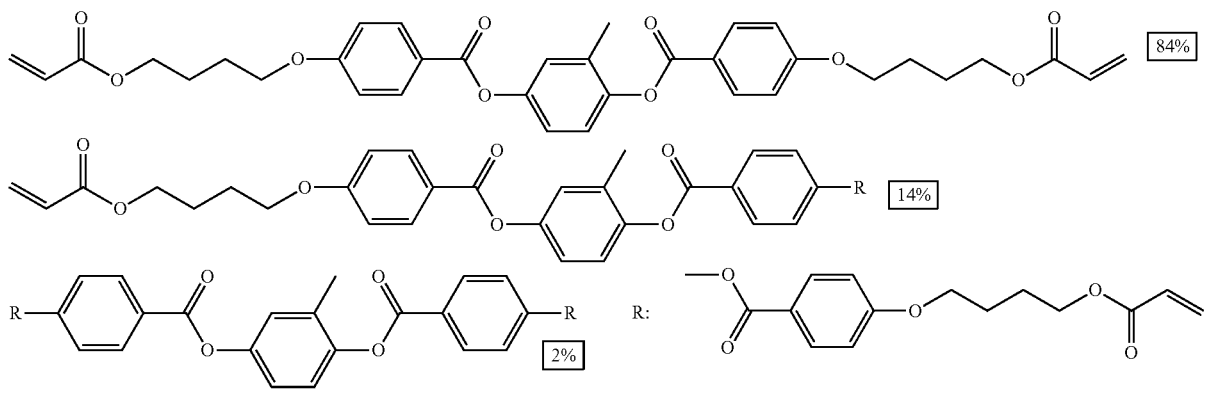

The above-described composition A-1 was applied to the alignment film P-1. The coating film of the composition A-1 was heated on a hot plate at 100° C. for 3 minutes. Next, the first exposure for changing the HTP of the chiral agent was performed using a high-pressure mercury lamp at 100° C. in a nitrogen atmosphere through a long pass filter of 300 nm and a short pass filter of 350 nm. The first exposure was performed such that the light irradiation dose measured at a wavelength of 315 nm was 9 mJ/cm$^2$.

Next, the second expression for curing the liquid crystal composition was performed at 100° C. by irradiating the coating film with ultraviolet light having a wavelength of 365 nm at an irradiation dose of 1000 mJ/cm$^2$ using a high-pressure mercury lamp in a nitrogen atmosphere. As a result, the liquid crystal composition A-3 was cured, the alignment of the liquid crystal compound was immobilized, and a cholesteric liquid crystal layer was formed.

A cross-section of the cholesteric liquid crystal layer was observed with an SEM.

As a result, bright portions and dark portions were parallel to a main surface of the cholesteric liquid crystal layer, and a state where an interval of the bright portions and the dark portions in a thickness direction, that is, a surface pitch continuously increased in the thickness direction from the alignment film side to a side away from the alignment film was observed. That is, the cholesteric liquid crystal layer has a pitch gradient structure. In addition, the average value of the surface pitch was 0.4 µm. It was verified that this cholesteric liquid crystal layer reflects right circularly polarized light and allows transmission of left circularly polarized light in the entire visible range. The surface pitch P was measured by setting the interval between the bright portions or between the dark portions in the normal direction with respect to the lines as a ½ pitch. As described above, the bright portions and the dark portions described herein refer to bright portions and dark portions derived from a cholesteric liquid crystalline phase in a case where a cross-section of the cholesteric liquid crystal layer was observed with an SEM.

Chiral Agent Ch-1

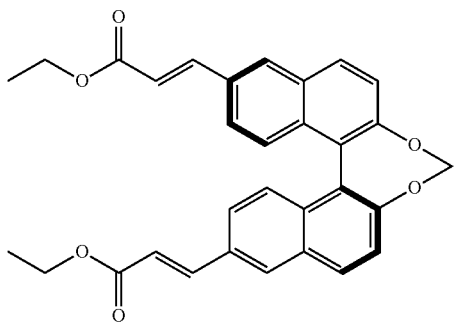

Leveling Agent T-1

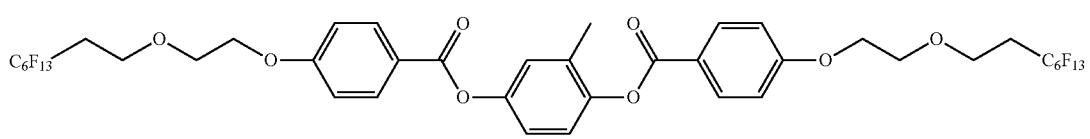

This way, a second reflective circularly polarizing plate was prepared.

<Preparation of First Reflective Circularly Polarizing Plate>

A cholesteric liquid crystal layer was formed using the same method as that of the method of preparing the second reflective circularly polarizing plate, except that 4.0 parts by mass of a chiral agent Ch-2 was used instead of the chiral agent Ch-1, and a first reflective circularly polarizing plate was prepared.

Chiral Agent Ch-2

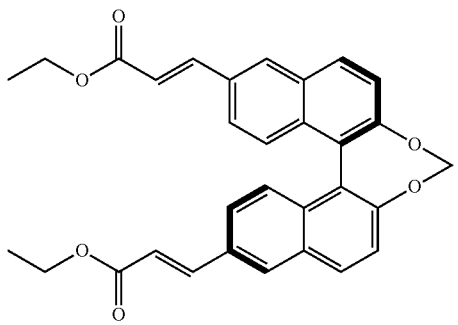

As a result of observing a cross-section of the cholesteric liquid crystal layer with an SEM, bright portions and dark portions were parallel to a main surface of the cholesteric liquid crystal layer, and a state where an interval of the bright portions and the dark portions in a thickness direction, that is, a surface pitch continuously increased in the thickness direction from the alignment film side to a side away from the alignment film was observed. That is, the cholesteric liquid crystal layer has a pitch gradient structure. In addition, the average value of the surface pitch was 0.4 μm. It was verified that this cholesteric liquid crystal layer reflects left circularly polarized light and allows transmission of right circularly polarized light in the entire visible range.

This way, a first reflective circularly polarizing plate was prepared.

Comparative Example 1

<Preparation of Head-Mounted Display Evaluation System>

An optical element was prepared using a first absorptive linearly polarizing plate, a first retardation plate (λ/4 plate), a partially reflecting mirror, a second retardation plate (λ/4 plate), a reflective linearly polarizing plate, and a second absorptive linearly polarizing plate, and an image display unit as a head-mounted display was prepared (refer to FIG. 3). Oculus Rift S manufactured by Facebook Technologies, LLC as a commercially available head-mounted display was disassembled, and a display and an absorptive linearly polarizing plate bonded to a surface of the display were disposed such that an absorption axis angle of the first absorptive linearly polarizing plate was 90°. As a partially reflecting mirror A, an aluminum film was formed by sputtering on a convex surface of a lens having a diameter of 5 cm and a curvature radius of 10 cm such that the transmittance was 50% and the reflectivity was 50%. That is, the partially reflecting mirror A had a curved shape. As the second reflective linearly polarizing plate, DBEF manufactured by 3M was used and disposed such that a transmission axis angle was 90°. The second absorptive linearly polarizing plate was disposed on a visible side of the second reflective linearly polarizing plate such that an absorption axis angle was 0°. In addition, the first retardation plate and the second retardation plate were disposed such that slow axes were 45° and −45°, respectively. The axis angle described herein was an angle with respect to (0°) a horizontal direction of the head-mounted display, and in a case where the image display apparatus was seen from the visible side, a clockwise direction was positive.

Example 1

In the configuration of Comparative Example 1, the first reflective linearly polarizing plate was disposed between the first absorptive linearly polarizing plate and the first retardation plate (refer to FIG. 2). The transmission axis of the second reflective linearly polarizing plate was parallel to the first reflective linearly polarizing plate. As the first reflective linearly polarizing plate, DBEF manufactured by 3M was used.

Example 2

In the configuration of Example 1, the first reflective linearly polarizing plate was removed, the first reflective circularly polarizing plate was disposed between the first retardation plate and the partially reflecting mirror, the second reflective circularly polarizing plate was disposed between the partially reflecting mirror and the second retardation plate, and the second reflective linearly polarizing plate was removed (refer to FIG. 6).

Example 3

In the configuration of Example 2, a partially reflecting mirror B was used instead of the partially reflecting mirror A (bonded product of a dielectric multi-layer film half mirror and a lens having a curvature radius of 10 cm). As a partially reflecting mirror B, an aluminum film was formed by sputtering on a flat glass substrate such that the transmittance was 50% and the reflectivity was 50%. Further, the distance between the first reflective circularly polarizing plate and the partially reflecting mirror B and the distance between the partially reflecting mirror B and the second reflective circularly polarizing plate were the same at 5 mm. Further, a liquid crystal diffraction element as a positive lens was inserted into a gap between the second reflective circularly polarizing plate and the second retardation plate. The liquid crystal diffraction element was prepared by adjusting a diffraction pitch such that the focal length as lens characteristics was 5 cm.

<Positive Lens: Preparation of Liquid Crystal Diffraction Element>

An alignment film was formed using the same method as that of the second reflective circularly polarizing plate according to Example 2.

(Exposure of Alignment Film)

The alignment film was exposed using the exposure device shown in FIG. 17 to form an alignment film P-2 having an alignment pattern.

In the exposure device, a laser that emits laser light having a wavelength (325 nm) was used as the laser. The exposure amount of the interference light was 300 mJ/cm$^2$. By using the exposure device shown in FIG. 17, the single period of the alignment pattern gradually decreased toward the outer direction.

(Formation of First Liquid Crystal Layer)

As the liquid crystal composition forming the liquid crystal layer, the following composition B-1 was prepared.

Composition B-1

| | |
|---|---|
| Liquid crystal compound L-1 | 100.00 parts by mass |
| Chiral agent Ch-A | 0.23 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Chiral Agent Ch-A

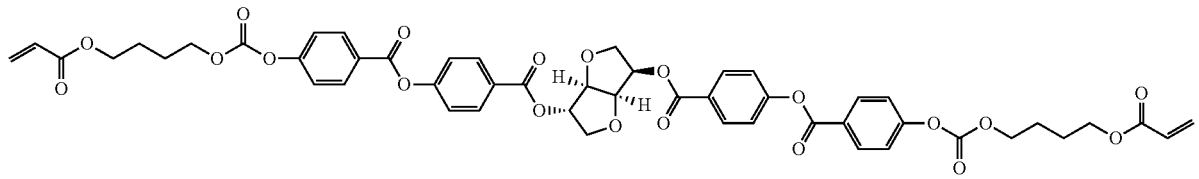 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

The first liquid crystal layer was formed by applying multiple layers of the composition B-1 to the alignment film P-2. The following processes were repeated, the processes including: preparing a first liquid crystal immobilized layer by applying the first layer-forming composition B-1 to the alignment film, heating the composition B-1, cooling the composition B-1, and irradiating the composition B-1 with ultraviolet light for curing; and preparing a second or subsequent liquid crystal immobilized layer by applying the second or subsequent layer-forming composition B-1 to the formed liquid crystal immobilized layer, heating the composition B-1, cooling the composition B-1, and irradiating the composition B-1 with ultraviolet light for curing as described above.

Regarding the first liquid crystal layer, the following composition B-1 was applied to the alignment film P-2 to form a coating film, the coating film was heated using a hot plate at 80° C., and the coating film was irradiated with ultraviolet light having a wavelength of 365 nm at an irradiation dose of 300 mJ/cm² using a high-pressure mercury lamp in a nitrogen atmosphere at 80° C. As a result, the alignment of the liquid crystal compound was immobilized.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, and the first liquid crystal layer was formed.

A complex refractive index $\Delta n$ of the cured layer of a liquid crystal composition B-1 was obtained by applying the liquid crystal composition B-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation $Re(\lambda)$ and the thickness of the liquid crystal immobilized layer. $\Delta n_\lambda$ can be calculated by dividing the retardation $Re(\lambda)$ by the thickness. The retardation $Re(\lambda)$ was measured by measuring a desired wavelength using Axoscan (manufactured by Axometrix Inc.) and measuring the thickness using an SEM. In the expression of $Re(\lambda)$, $\lambda$ represents the wavelength of incidence light. In the following description, the wavelength $\lambda$ of incidence light was 550 nm.

Finally, in the first liquid crystal layer, $\Delta n_{550} \times$ thickness=Re(550) of the liquid crystals was 275 nm, and it was verified using a polarization microscope that concentric circular periodic alignment occurred as shown in FIG. 16. In the concentric circular pattern, the period decreased in a direction from the center toward the outer side. In addition, the twisted angle of the first liquid crystal layer in the thickness direction was 70° (right twisted). Hereinafter, unless specified otherwise, "$\Delta n_{550} \times$ thickness" and the like were measured as described above. In addition, in the cross sectional image with an SEM, bright and dark lines that were tilted with respect to the lower interface (interface with the glass substrate) of the liquid crystal layer were observed. In the repeating pattern of the bright and dark lines, a state where the period decreased from the center toward the outer side was observed.

(Formation of Second Liquid Crystal Layer)

As the liquid crystal composition forming the liquid crystal layer, the following composition B-2 was prepared.

Composition B-2

| | |
|---|---|
| Liquid crystal compound L-1 | 100.00 parts by mass |
| Chiral agent Ch-B | 0.39 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Chiral Agent Ch-B

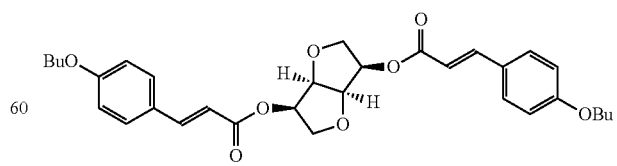

The second liquid crystal layer was formed on the first liquid crystal layer using the same method as that of the first liquid crystal layer, except that the composition B-2 was used, and a liquid crystal diffraction element was prepared.

Finally, in the second liquid crystal layer, $\Delta n_{550} \times$ thickness=Re(550) of the liquid crystals was 275 nm, and it was verified using a polarization microscope that concentric circular periodic alignment occurred as shown in FIG. 16. In the concentric circular pattern, the period decreased in a direction from the center toward the outer side. In addition, the twisted angle of the first liquid crystal layer in the thickness direction was 70° (left twisted). In addition, in the cross sectional image with an SEM, bright and dark lines that were tilted with respect to the lower interface (interface with the glass substrate) of the liquid crystal layer were observed. In the first liquid crystal layer and the second liquid crystal layer, the directions in which the bright and dark lines were tilted with respect to the normal line were opposite to each other. In the repeating pattern of the bright and dark lines, a state where the period decreased from the center toward the outer side was observed.

<Brightness Evaluation of Head-Mounted Display>

The display in the image display unit including the optical element according to the embodiment of the present invention was removed, and a light source for evaluation was disposed. As the light source for evaluation, a laser pointer (wavelength: 532 nm) was used. Using the laser pointer, light was caused to be incident from the first absorptive linearly polarizing plate side of the optical element, and the intensity of emitted light was measured using a power meter. An intensity ratio relative to Comparative Example was evaluated based on the following standards.

A: the intensity ratio was 1.5 or higher
B: the intensity ratio was 1.2 or higher and lower than 1.5
C: the intensity ratio was 1.0 or higher and lower than 1.2

The results of the evaluation of Examples 1 to 3 were A. On the other hand, the result of the evaluation of Comparative Example 1 was C. That is, it can be seen that, in Examples of the present invention, the utilization efficiency of light can be improved as compared to Comparative Example.

As can be seen from the above results, the effects of the present invention are obvious.

Explanation of References 10a, 10b: optical element
12: first absorptive linearly polarizing plate
14: first reflective linearly polarizing plate
16: first retardation layer
18: partially reflecting mirror
20: second retardation plate
22, 22b: second reflective linearly polarizing plate
24, 24b: second absorptive linearly polarizing plate
26: first reflective circularly polarizing plate
28: second reflective circularly polarizing plate
29: positive lens
30, 31: support
32, 33: alignment film
34: cholesteric liquid crystal layer
36: optically-anisotropic layer (liquid crystal layer)
40: liquid crystal compound
40A: optical axis
42: bright portion
44: dark portion
50, 50b: image display unit
52: image display apparatus
60, 80: exposure device
62, 82: laser
64, 84: light source
65: $\lambda/2$ plate
68, 86, 94: polarization beam splitter
70A, 70B, 90A, 90B: mirror
72A, 72B, 96: $\lambda/4$ plate
92: lens
D: arrangement axis
$\Lambda$: single period
P: pitch
U: user
M: laser light
MA, MB: beam
MP: P polarized light
MS: S polarized light
$P_0$: linearly polarized light
$P_R$: right circularly polarized light
$P_L$: left circularly polarized light
$\alpha$: intersecting angle
R: region
$L_1$: light
$L_2$: light
$L_4$: light
$L_5$: light

What is claimed is:

1. An optical element comprising, in the following order:
a first absorptive linearly polarizing plate;
a first reflective linearly polarizing plate;
a first retardation plate;
a partially reflecting mirror that allows transmission of a part of incident light and reflects a part of the incident light;
a second retardation plate; and
a second reflective linearly polarizing plate,
wherein a positive lens disposed on a side of the second reflective linearly polarizing plate opposite to the second retardation plate,
the positive lens is a diffraction lens using a diffraction element, and
a turning direction of circularly polarized light that is reflected in a case where light transmits through the first retardation plate and is incident into the first reflective linearly polarizing plate is opposite to a turning direction of circularly polarized light that is reflected in a case where light transmits through the second retardation plate and is incident into the second reflective linearly polarizing plate.

2. The optical element according to claim 1, wherein the diffractive lens is a liquid crystal diffraction element that includes a liquid crystal layer including a liquid crystal compound.

3. The optical element according to claim 1, wherein the diffractive lens is a liquid crystal diffraction element that includes a liquid crystal layer including a liquid crystal compound,
the liquid crystal layer has a liquid crystal alignment pattern in which a direction of an optical axis derived from the liquid crystal compound changes while continuously rotating in at least one in-plane direction, and
in a case where a length over which the direction of the optical axis derived from the liquid crystal compound in the liquid crystal alignment pattern of the liquid crystal layer rotates by 180° in an in-plane direction is set as a single period of a diffraction structure, the liquid crystal layer has regions where periods of the diffraction structures are different in a plane.

4. The optical element according to claim 3, wherein in a cross-section of the liquid crystal layer observed with a scanning electron microscope, the liquid crystal layer has regions where bright portions and dark portions derived from a liquid crystal phase are tilted with respect to a main surface of the liquid crystal layer.

5. The optical element according to claim 1,
wherein a cross-section of the partially reflecting mirror has a curved shape.

6. The optical element according to claim 1,
wherein the first retardation plate and the second retardation plate are λ/4 plates.

7. An image display unit comprising:
the optical element according to claim 1; and
an image display apparatus that is disposed on a first absorptive linearly polarizing plate side of the optical element.

8. A head-mounted display comprising:
the image display unit according to claim 7.

* * * * *